US011830062B2

(12) United States Patent
Inoue

(10) Patent No.: US 11,830,062 B2
(45) Date of Patent: Nov. 28, 2023

(54) WATERCRAFT RENTAL SYSTEM, A WATERCRAFT RENTAL METHOD, AND A COMPUTER FOR A WATERCRAFT

(71) Applicant: YAMAHA HATSUDOKI KABUSHIKI KAISHA, Iwata (JP)

(72) Inventor: Hiroshi Inoue, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 104 days.

(21) Appl. No.: 17/223,075

(22) Filed: Apr. 6, 2021

(65) Prior Publication Data
US 2021/0312538 A1 Oct. 7, 2021

(30) Foreign Application Priority Data
Apr. 7, 2020 (JP) ................................ 2020-069435

(51) Int. Cl.
*G06Q 30/06* (2023.01)
*G06Q 10/02* (2012.01)
(Continued)

(52) U.S. Cl.
CPC ......... *G06Q 30/0645* (2013.01); *G06Q 10/02* (2013.01); *G06Q 50/30* (2013.01);
(Continued)

(58) Field of Classification Search
CPC .... G06Q 30/0645; G06Q 50/30; G07C 5/008; G07C 9/00182; G07C 9/00896
(Continued)

(56) References Cited

U.S. PATENT DOCUMENTS

2003/0109184 A1* 6/2003 Kanno ................. F02B 61/045
440/1
2005/0003716 A1* 1/2005 Takashima ............... B63J 99/00
440/85
(Continued)

FOREIGN PATENT DOCUMENTS

JP 2002-157485 A 5/2002
JP 2013-216332 A 10/2013
(Continued)

OTHER PUBLICATIONS

Ledsom, Alex; "Airbnb for Boats: Water-Based Sharing Apps Are on the Rise"; Nov. 2, 2019; https://www.forbes.com/sites/alexledsom/2019/11/02/airbnb-for-boats-how-water-based-sharing-apps-are-on-the-rise/?sh=46df48398df8 (Year: 2019).*
(Continued)

*Primary Examiner* — Dione N. Simpson
(74) *Attorney, Agent, or Firm* — KEATING AND BENNETT, LLP

(57) ABSTRACT

A watercraft rental system is used to rent an owner's watercraft to a user. The watercraft rental system includes a computer and a user terminal. The computer communicates with the watercraft and records rental condition information of the watercraft. The user terminal provides borrowing request information to the computer. The borrowing request information corresponds to a response to the rental condition information. The computer executes a rental process of the watercraft based on the borrowing request information.

16 Claims, 15 Drawing Sheets

(51) Int. Cl.
*G06Q 50/30* (2012.01)
*G07C 5/00* (2006.01)
*G07C 5/08* (2006.01)
*G07C 9/00* (2020.01)
*G06Q 30/0645* (2023.01)
*G07C 9/20* (2020.01)

(52) U.S. Cl.
CPC .............. *G07C 5/004* (2013.01); *G07C 5/006* (2013.01); *G07C 5/008* (2013.01); *G07C 5/08* (2013.01); *G07C 9/00182* (2013.01); *G07C 9/00309* (2013.01); *G07C 9/00896* (2013.01); *G07C 9/20* (2020.01); *G07C 2009/00753* (2013.01)

(58) Field of Classification Search
USPC .......................................................... 705/13
See application file for complete search history.

(56) References Cited

U.S. PATENT DOCUMENTS

| | | | | |
|---|---|---|---|---|
| 2010/0042340 | A1* | 2/2010 | Piszko | G01F 9/008 702/55 |
| 2011/0246246 | A1* | 10/2011 | Johnson | G06Q 10/0631 705/5 |
| 2013/0238167 | A1* | 9/2013 | Stanfield | E05B 81/56 701/2 |
| 2013/0321178 | A1 | 12/2013 | Jameel et al. | |
| 2014/0049387 | A1 | 2/2014 | Brown et al. | |
| 2014/0129053 | A1* | 5/2014 | Kleve | G07F 17/0057 701/2 |
| 2014/0350778 | A1* | 11/2014 | Gressus | B60R 16/00 701/32.6 |
| 2017/0101076 | A1* | 4/2017 | Krishnan | B60R 25/2045 |
| 2018/0091930 | A1* | 3/2018 | Jefferies | G07C 9/00571 |
| 2019/0016301 | A1* | 1/2019 | Merkel | B60R 16/037 |
| 2019/0033868 | A1 | 1/2019 | Ferguson et al. | |
| 2019/0236691 | A1* | 8/2019 | Avello | G07C 9/00309 |
| 2019/0272755 | A1* | 9/2019 | Giorgi | H04W 4/40 |

FOREIGN PATENT DOCUMENTS

| | | | | |
|---|---|---|---|---|
| WO | WO-2008151395 A2 * | 12/2008 | | B63B 21/16 |
| WO | 2011/139363 A1 | 11/2011 | | |

OTHER PUBLICATIONS

Inoue, "A Watercraft Rental System, a Watercraft Rental Method, and a Computer for a Watercraft", U.S. Appl. No. 17/903,298, filed Sep. 6, 2022.
Official Communication issued in corresponding European Patent Application No. 21165316.7, dated Sep. 3, 2021.
Official Communication issued in corresponding European Patent Application No. 21165316.7, dated Feb. 11, 2022.

* cited by examiner

WATERCRAFT RENTAL SYSTEM, A WATERCRAFT RENTAL METHOD, AND A COMPUTER FOR A WATERCRAFT

CROSS REFERENCE TO RELATED APPLICATIONS

This application claims the benefit of priority to Japanese Patent Application No. 2020-069435 filed on Apr. 7, 2020. The entire contents of this application are hereby incorporated herein by reference.

BACKGROUND OF THE INVENTION

1. Field of the Invention

The present invention relates to a watercraft rental system, a watercraft rental method, and a computer for a watercraft.

2. Description of the Related Art

In the prior art, a system in which a user reserves a watercraft based on a watercraft list of a plurality of watercraft vendors is disclosed (see Japanese Patent Application Laid-Open No. 2002-157485). Each of the watercraft vendors manages a plurality of watercrafts. The captain of the watercraft on which the user boards is prepared by the watercraft vendor.

The conventional watercraft reservation system is a system in which a user reserves a watercraft via a watercraft operator. However, a system for individual owners to rent their own watercrafts has not been established.

SUMMARY OF THE INVENTION

Preferred embodiments of the present invention provide watercraft rental systems each of which is able to directly rent an owner's watercraft to a user.

Additional preferred embodiments of the present invention provide computers for watercraft each of which is able to directly rent an owner's watercraft to a user. Other preferred embodiments of the present invention provide watercraft rental methods each of which is able to directly rent an owner's watercraft to a user.

A watercraft rental system according to a preferred embodiment of the present invention is used to rent an owner's watercraft to a user. The watercraft rental system includes a computer and a user terminal. The computer is configured to communicate with the watercraft and record rental condition information of the watercraft. The user terminal is configured to provide borrowing request information to the computer. The borrowing request information corresponds to a response to the rental condition information. The computer is configured to execute a rental process of the watercraft based on the borrowing request information.

A computer for a watercraft according to a preferred embodiment of the present invention is used to rent an owner's watercraft to a user. The computer includes a recorder, an information provider, an information receiver, and processor circuitry. The recorder is configured or programmed to record rental condition information of the watercraft. The information provider is configured or programmed to provide the rental condition information to a user terminal. The information receiver is configured or programmed to receive borrowing request information from the user terminal. The borrowing request information corresponds to a response to the rental condition information. The processor circuitry is configured or programmed to execute a rental process of the watercraft based on the borrowing request information.

A watercraft rental method according to a preferred embodiment of the present invention is performed by a computer to rent an owner's watercraft to a user. The watercraft rental method includes recording rental condition information of the watercraft, providing the rental condition information to a user terminal, receiving borrowing request information from the user terminal in which the borrowing request information corresponds to a response to the rental condition information, and executing a rental process of the watercraft based on the borrowing request information.

According to various preferred embodiments of the present invention, it is possible to directly rent the owner's watercraft to the user by using the watercraft rental system, the computer, and the watercraft rental method.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments will be described with reference to the drawings.

Figure 1:
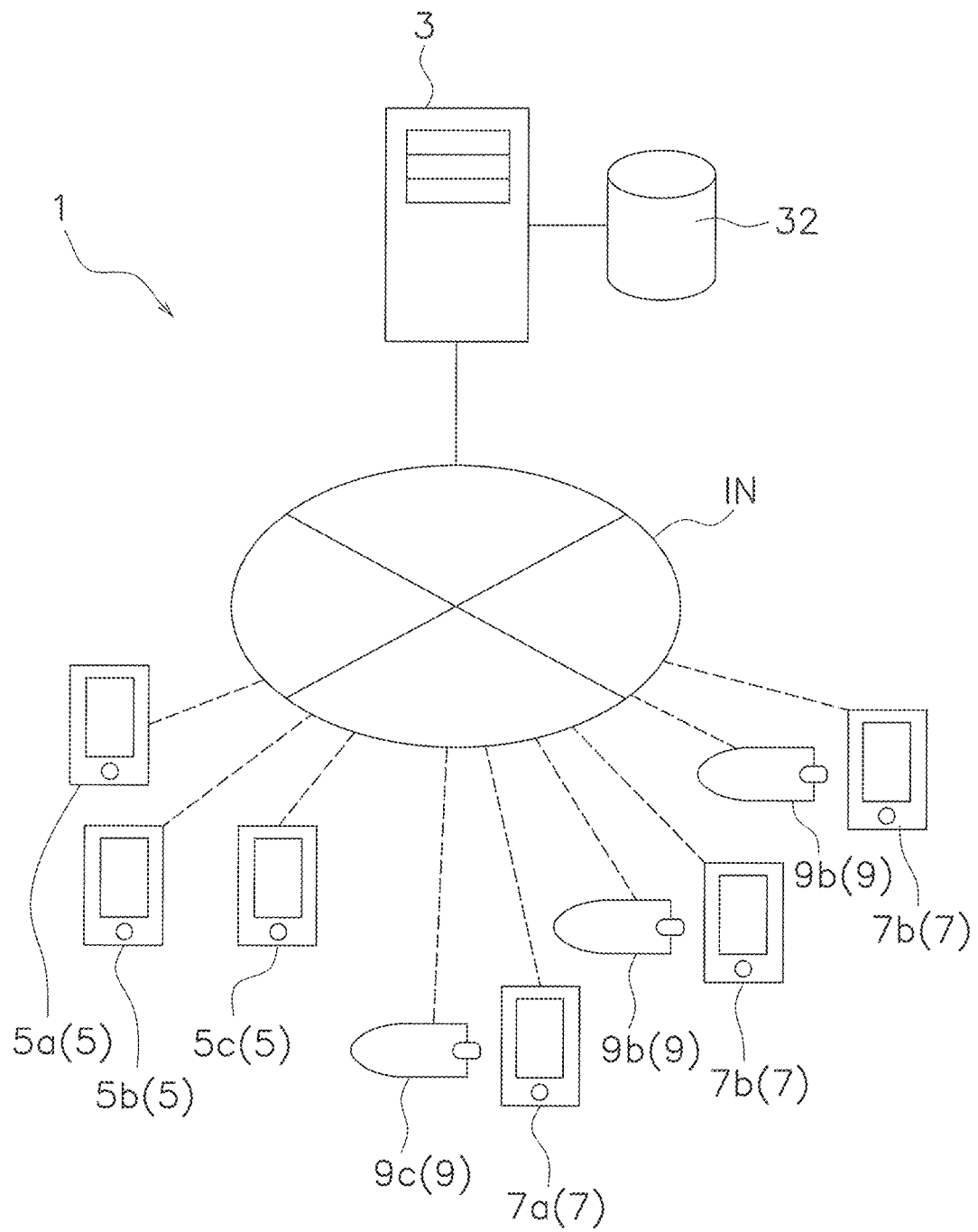
FIG. 1 is a schematic diagram which shows a watercraft rental system according to a preferred embodiment of the present invention.

The watercraft rental system 1 is used to rent an owner's watercraft to a user. As shown in FIG. 1, the watercraft rental system 1 includes a cloud server 3 (an example of a computer), at least one owner terminal 5, and at least one user terminal 7.

The cloud server 3 may include one computer or a plurality of computers. In the present preferred embodiment, an example in which the cloud server 3 includes one computer is illustrated.

In the present preferred embodiment, an example in which the watercraft rental system 1 includes the cloud server 3, the plurality of owner terminals 5, and the plurality of user terminals 7 is illustrated. In FIG. 1, the reference numerals "5a, 5b, 5c" indicate the plurality of owner terminals 5, respectively, and the reference numerals "7a, 7b, 7c" indicate the plurality of user terminals 7, respectively.

The watercraft rental system 1 further includes a communicator 92, a watercraft position detector 93, and an engine operation detector 94, which will be described below (see FIG. 2). The communicator 92, the watercraft position detector 93, and the engine operation detector 94 are provided on the watercraft 9. In other words, the watercraft rental system 1 includes the cloud server 3, the owner terminal 5, the user terminal 7, and a watercraft 9.

In FIG. 1, the reference numerals "9a, 9b, 9c" indicate the watercrafts 9 owned by the owners, respectively. The watercrafts 9 may be, but are not limited to, ships, boats, etc., or any other suitable types of marine vessels. The watercraft 9a is owned by the owner of the owner terminal 5a. The watercraft 9b is owned by the owner of the owner terminal 5b. The watercraft 9c is owned by the owner of the owner terminal 5c. Any one of the plurality of watercrafts 9a, 9b, 9c is rented to one user.

The cloud server 3, the owner terminal 5 (5a, 5b, 5c), the user terminal 7 (7a, 7b, 7c), and the watercraft 9 (9a, 9b, 9c) are able to communicate with each other via the Internet IN, for example.

The watercraft rental system 1 further includes a maintenance information providing terminal, which transmits maintenance information indicating an end of maintenance of the watercraft 9, to the cloud server 3. In the present preferred embodiment, an example in which the maintenance information providing terminal is the owner terminal 5 is illustrated.

The maintenance information providing terminal may be a third-party terminal other than the user terminal 7 and the owner terminal 5. In this case, for example, the third party terminal is a terminal of a maintenance company that performs the maintenance of the watercraft 9 (9a, 9b, 9c).

The word "information" is used in the following description. The word "information" includes the meaning of "data".

Each of the plurality of owner terminals 5a, 5b, and 5c illustrated in FIG. 1 includes the following configuration. In the following, each owner terminal 5a, 5b, 5c will be described with the word "owner terminal 5".

The owner terminal 5 is a communication terminal which communicates with the cloud server 3. For example, the owner terminal 5 includes a smartphone, a tablet, a desktop personal computer, a notebook personal computer, a wearable terminal, and the like.

Figure 2:
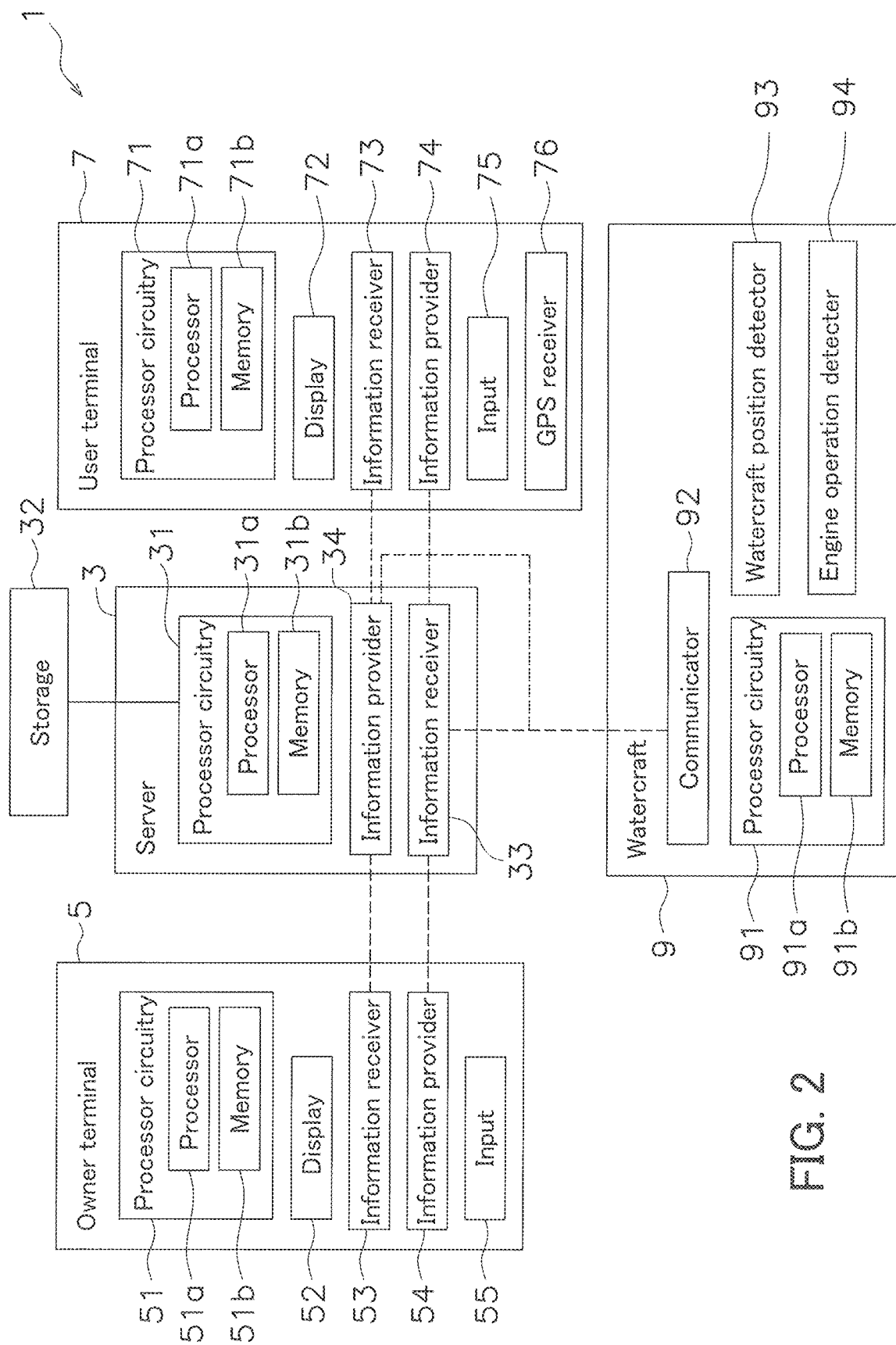
FIG. 2 is a functional block diagram of the watercraft rental system.

As shown in FIG. 2, the owner terminal 5 includes processor circuitry 51 of the owner terminal 5, a display 52 of the owner terminal 5, an information receiver 53 of the owner terminal 5, an information provider 54 of the owner terminal 5, and an input 55 of the owner terminal 5.

The processor circuitry 51 of the owner terminal 5 processes various information in the owner terminal 5. The processor circuitry 51 of the owner terminal 5 controls the display 52 of the owner terminal 5, the information receiver 53 of the owner terminal 5, and the information provider 54 of the owner terminal 5.

For example, the processor circuitry 51 of the owner terminal 5 includes a processor 51a and a memory 51b. The processor 51a is, for example, a CPU (e.g., central processor circuitry). The processor 51a processes various information of the owner terminal 5 based on the program recorded in the memory 51b.

The processor 51a controls the display 52 of the owner terminal 5, the information receiver 53 of the owner terminal 5, and the information provider 54 of the owner terminal 5 based on the program recorded in the memory 51b.

The input 55 of the owner terminal 5 accepts an owner's input. The input information and the input signal for the input 55 of the owner terminal 5 are recognized by the processor 51a.

The memory 51b records various information which is processed by the processor 51a and various programs which are executed by the processor 51a. The memory 51b includes a volatile memory such as RAM. The memory 51b includes a non-volatile memory such as a ROM.

The display 52 of the owner terminal 5 displays information. Specifically, the display 52 of the owner terminal 5 displays the information based on the command of the processor 51a of the owner terminal.

The information receiver 53 of the owner terminal 5 receives information and signals from the cloud server 3. The information and signals received from the cloud server 3 are recognized by the processor 51a of the owner terminal. The information received from the cloud server 3 is recorded in the memory 51b of the owner terminal.

The information provider 54 of the owner terminal 5 transmits information and signals to the cloud server 3. For example, the information provider 54 of the owner terminal 5 transmits the information and the signals to the cloud server 3 based on the command of the processor 51a of the owner terminal. The information provider 54 of the owner terminal 5 transmits the information and the signals to the cloud server 3 when the input 55 of the owner terminal 5 receives a transmission command.

The input 55 of the owner terminal 5 acquires the input information which is input by the owner. The owner's input information is recognized by the processor 51a of the owner terminal. The input 55 of the owner terminal 5 may be realized by hardware or software. For example, the input 55 of the owner terminal 5 may be an input such as a physical button or an input such as a touch panel. When a touch panel or the like is used, it is preferable that the display 52 of the owner terminal 5 is used as the input 55 of the owner terminal 5.

Watercraft information and owner information are input from the input 55 of the owner terminal 5. The watercraft information includes watercraft body information, engine information, equipment information, and the like. The owner information includes the name of the owner and identification information of the owner terminal 5.

The processor 51a of the owner terminal recognizes the watercraft information and the owner information, and records the watercraft information and the owner information in the memory 51b of the owner terminal. The processor 51a of the owner terminal issues a command, which is used to provide the watercraft information and the owner information to the cloud server 3, to the information provider 54 of the owner terminal 5. Thus, the watercraft information and the owner information are provided from the owner terminal 5 to the cloud server 3.

The owner terminal 5 including the above configuration provides various information to the cloud server 3 and receives various information from the cloud server 3. For example, the owner terminal 5 receives rental condition input information, which is used to input the rental condition information of the owner, from the cloud server 3 via the information receiver 53 of the owner terminal 5.

The rental condition input information may be pre-recorded in an application used to rent the watercraft. In this case, the owner terminal 5 may receive the rental condition input information when the application used to rent the watercraft is downloaded from the cloud server 3. The owner terminal 5 may receive the rental condition input information when the application used to rent the watercraft is downloaded from a server different from the cloud server 3 (for example, a server for the application).

The rental condition input information includes item information to input date-time information on which each of the plurality of owners rents the watercraft 9, rental information of the watercraft 9, driver addition information, and the like. The rental information of the watercraft 9 includes charge information, fuel charges, and the like. The driver addition information includes information to inquire whether or not the user desires to add the driver of the watercraft 9.

The rental condition input information is displayed on the display 52 of the owner terminal 5. For example, the processor 51a of the owner terminal displays the item information, which is used to input the date-time information, the rental information, the driver addition information, and the like, on the display 52 of the owner terminal 5.

The owner terminal 5 generates the rental condition information with the processor 51a of the owner terminal. The rental condition information includes information provided to the user when each of the plurality of owners rents the watercraft 9. For example, the rental condition information is generated by inputting the rental condition with respect to the rental condition input information.

For example, when the date-time information, the rental information, the driver addition information, and the like are input to the above item information via the input 55 of the owner terminal 5, the rental condition information is generated.

Specifically, the date-time information, the rental information, the driver addition information, and the like are recognized by the processor 51a of the owner terminal, by inputting the date-time information, the rental information, the driver addition information, and the like on the input 55 of the owner terminal 5.

The processor 51a of the owner terminal records the date-time information, the rental information, the driver addition information, and the like in the memory 51b of the owner terminal as the rental condition information.

The owner terminal 5 displays the rental condition information on the display 52 of the owner terminal 5. For example, the processor 51a of the owner terminal reads the rental condition information from the memory 51b of the owner terminal, and displays the rental condition information on the display 52 of the owner terminal 5.

The owner terminal 5 provides the owner's rental condition information to the cloud server 3. For example, the owner terminal 5 transmits the rental condition information to the cloud server 3 via the information provider 54 of the owner terminal 5.

For example, when the input 55 of the owner terminal 5 receives the transmission command, the processor 51a of the owner terminal transmits the rental condition information from the information provider 54 of the owner terminal 5 to the cloud server 3.

The owner terminal 5 transmits the maintenance information, which indicates the end of maintenance of the watercraft 9, to the cloud server 3. The maintenance information includes information which indicates the end of maintenance of the watercraft 9 such as fuel calibration and confirmation of fuel replenishment status.

The owner terminal 5 receives answer input information from the cloud server 3 via the information receiver 53 of the owner terminal 5. The answer input information is transmitted from the cloud server 3 to the owner terminal 5 when the user submits a requests to borrow the watercraft 9 to the owner.

The answer input information may be pre-recorded in the application used to rent the watercraft. In this case, the owner terminal 5 may receive the answer input information when the application used to rent the watercraft is downloaded from the cloud server 3. The owner terminal 5 may receive the answer input information when the application used to rent the watercraft is downloaded from a server different from the cloud server 3 (for example, a server for the application).

The answer input information includes item information to input permission information to permit the borrowing of the watercraft 9 and item information to input refusal information to refuse the borrowing of the watercraft 9. The answer input information is displayed on the display 52 of the owner terminal 5.

The answer input information includes a pull-down menu in which permission items and refusal items are able to be directly selected, respectively. It may include a check box in which the permission items and the refusal items are able to be selected, respectively. It may include an input box to directly input character information of the permission items and the refusal items.

In the owner terminal 5, the answer information is input to the answer input information. For example, when the permission item or the refusal item is selected, the processor 51a of the owner terminal recognizes the permission information corresponding to the permission item or the refusal information corresponding to the refusal item as answer information. The processor 51a of the owner terminal records the answer information in the memory 51b of the owner terminal. The answer information includes permission information or refusal information.

The owner terminal 5 displays the answer information on the display 52 of the owner terminal 5. For example, the processor 51a of the owner terminal reads the answer information from the memory 51b of the owner terminal, and displays the answer information on the display 52 of the owner terminal 5.

The owner terminal 5 transmits the answer information to the cloud server 3. For example, the processor 51a of the owner terminal transmits the answer information to the cloud server 3 via the information provider 54 of the owner terminal 5. Specifically, when the input 55 of the owner terminal 5 receives the transmission command, the processor 51a of the owner terminal transmits the answer information to the cloud server 3 via the information provider 54 of the owner terminal 5.

The owner terminal 5 receives contract information from the cloud server 3. For example, the owner terminal 5 receives the contract information from the cloud server 3 via the information receiver 53 of the owner terminal 5. The contract information includes the content indicating the establishment or non-establishment of the contract and the rental condition information.

The owner terminal 5 receives navigation distance information and fuel consumption information from the cloud server 3. For example, the owner terminal 5 receives the navigation distance information and the fuel consumption information from the cloud server 3 via the information receiver 53 of the owner terminal 5. The navigation distance information includes information indicating the distance that the watercraft 9, which the owner rented to the user, travels. The fuel consumption information includes information indicating the fuel that the watercraft 9, which the owner rented to the user, consumes during navigation.

The owner terminal 5 receives time information and watercraft position information at the start of navigation and time information and watercraft position information at the end of navigation from the cloud server 3 via the information receiver 53 of the owner terminal 5.

The owner terminal 5 displays the time information and the watercraft position information at the start of navigation and the time information and the watercraft position information at the end of navigation on the display 52 of the owner terminal 5. The owner terminal 5 receives the fuel consumption information and the navigation distance information from the cloud server 3 via the information receiver 53 of the owner terminal 5.

The owner terminal 5 displays the time information and the watercraft position at the start of navigation, the time information and the watercraft position information at the end of navigation, and the fuel consumption information and the navigation distance information on the display 52 of the owner terminal 5.

Each of the plurality of user terminals 7a, 7b, 7c illustrated in FIG. 1 includes the following configuration. In the following, each user terminal 7a, 7b, 7c will be described with the word "user terminal 7".

The user terminal 7 is a communication terminal which communicates with the cloud server 3. For example, the user terminal 7 includes a smartphone, a tablet, a desktop personal computer, a notebook personal computer, a wearable terminal, and the like.

As shown in FIG. 2, the user terminal 7 includes processor circuitry 71 of the user terminal 7, a display 72 of the user terminal 7, an information receiver 73 of the user terminal 7, an information provider 74 of the user terminal 7, and an input 75 of the user terminal 7.

The processor circuitry 71 of the user terminal 7 processes various information in the user terminal 7. The processor circuitry 71 of the user terminal 7 controls the display 72 of the user terminal 7, the information receiver 73 of the user terminal 7, and the information provider 74 of the user terminal 7.

For example, the processor circuitry 71 of the user terminal 7 includes a processor 71a and a memory 71b. The processor 71a is, for example, a CPU. The processor 71a processes various information of the user terminal 7 based on the program recorded in the memory 71b. The processor 71a controls the display 72 of the user terminal 7, the information receiver 73 of the user terminal 7, and the information provider 74 of the user terminal 7 based on the program recorded in the memory 71b.

The input 75 of the user terminal 7 accepts a user's input. The input information and the input signal for the input 75 of the user terminal 7 are recognized by the processor 71a.

The memory 71b records various information processed by the processor 71a and various programs which are executed by the processor 71a. The memory 71b includes a volatile memory such as RAM. The memory 71b includes a non-volatile memory such as a ROM.

The display 72 of the user terminal 7 displays information. Specifically, the display 72 of the user terminal 7 displays the information based on the command of the processor 71a of the user terminal 7.

The information receiver 73 of the user terminal 7 receives information and signals from the cloud server 3. The information and signals received from the cloud server 3 are recognized by the processor 71a of the user terminal 7. The information received from the cloud server 3 is recorded in the memory 71b of the user terminal 7.

The information provider 74 of the user terminal 7 transmits information and signals to the cloud server 3. For example, the information provider 74 of the user terminal 7 transmits the information and the signals to the cloud server 3 based on the command of the processor 71a of the user terminal 7.

For example, when the input 75 of the user terminal 7 receives the transmission command, the processor 71a of the user terminal 7 transmits the information and the signals from the information provider 74 of the user terminal 7 to the cloud server 3.

The input 75 of the user terminal 7 acquires the user's input. The input 75 of the user terminal 7 may be realized by hardware or software. For example, the input 75 of the user terminal 7 may be an input such as a physical button or an input such as a touch panel. When a touch panel or the like is used, it is preferable that the display 72 of the user terminal 7 is used as the input 75 of the user terminal 7.

The user terminal 7 including the above configuration receives various information via the information receiver 73 of the user terminal 7. The user terminal 7 transmits various types of information via the information provider 74 of the user terminal 7.

For example, the user terminal 7 receives a plurality of rental condition information from the cloud server 3 via the information receiver 73 of the user terminal 7. The user terminal 7 receives a borrowing input list from the cloud server 3 via the information receiver 73 of the user terminal 7.

The processor 71a of the user terminal 7 displays the plurality of rental condition information and the borrowing input list on the display 72 of the user terminal 7. For example, the borrowing input list includes the plurality of watercraft information on which the user is borrowing and/or the plurality of owner information on which the user is able to request borrowing.

The borrowing input list includes a check box in which the plurality of watercraft information and/or the plurality of owner information are able to be selected, respectively. It may include a check box in which permission items and refusal items are able to be selected, respectively. It may include an input box to directly input character information of the permission items and the refusal items.

The borrowing input list may include an input box to direct input of the plurality of watercraft information and/or the plurality of owner information by characters, symbols, or the like. The borrowing input list may include a pull-down menu in which the plurality of watercraft information and/or the plurality of owner information are able to be directly selected, respectively.

The user terminal 7 generates borrowing request information of the user with the processor 71a of the user terminal 7. The borrowing request information includes information requesting the borrowing of the user for the watercraft 9 of the owner. For example, the borrowing request information of the user is generated by inputting the borrowing request information into the borrowing input list.

For example, when the watercraft information and/or the owner information, that the user requests the borrowing in the borrowing input list, is selected in the input 75 of the user terminal 7, the borrowing request information is generated.

Specifically, the watercraft information and the owner information, that the user requests the borrowing, are recognized by the processor 71a of the user terminal 7, by selecting the watercraft information and/or the owner information in the input 75 of the user terminal 7. The processor 71a of the user terminal 7 records the watercraft information and the owner information in the memory 71b of the user terminal 7 as the borrowing request information.

The processor 71a of the user terminal 7 displays item information to input the user's desired rental date-time information for the owner that the user requests the borrowing, on the display 72 of the user terminal 7, based on the watercraft information and the owner information.

The processor 71a of the user terminal 7 displays the item information to input the driver request information for the owner, that the user requests the borrowing, on the display 72 of the user terminal 7, based on the watercraft information and the owner information.

When the user's desired rental date-time information and the driver request information are input to the above item information via the input 75 of the user terminal 7, the processor 71a of the user terminal 7 recognizes the user information, the watercraft information, the owner information, the user's desired rental date-time information, and the driver request information as the borrowing request information.

In other words, the processor 71a of the user terminal 7 generates the borrowing request information which includes the user information, the watercraft information, the owner information, the user's desired rental date-time information, and the driver request information. The processor 71a of the user terminal 7 records the borrowing request information in the memory 71b of the user terminal 7.

The user terminal 7 displays the borrowing request information on the display 72 of the user terminal 7. For example, the processor 71a of the user terminal 7 reads out the borrowing request information (the user information, the watercraft information, the owner information, the user's desired rental date-time information, and the driver request information) from the memory 71b of the user terminal 7. The processor 71a of the user terminal 7 displays the borrowing request information on the display 72 of the user terminal 7.

The user terminal 7 provides the borrowing request information to the cloud server 3. For example, the user terminal 7 transmits the borrowing request information to the cloud server 3 via the information provider 74 of the user terminal 7.

For example, the processor 71a of the user terminal 7 issues a transmission command, which is used to transmit the borrowing request information to the cloud server 3, to the information provider 74 of the user terminal 7.

Specifically, when the input 75 of the user terminal 7 receives the transmission command, the processor 71a of the user terminal 7 issues the above transmission command to the information provider 74 of the user terminal 7.

The user terminal 7 receives the answer information from the cloud server 3 via the information receiver 73 of the user terminal 7. The user terminal 7 receives the contract information from the cloud server 3 via the information receiver 73 of the user terminal 7.

The user terminal 7 records the answer information and the contract information in the memory 71b of the user terminal 7. The user terminal 7 reads the answer information and the contract information from the memory 71b of the user terminal 7 and displays them on the display 72 of the user terminal 7.

The user terminal 7 transmits confirmation information to the cloud server 3 via the information provider 74 of the user terminal 7. The confirmation information includes information indicating the user's confirmation of the answer information (the owner's permission information or the owner's refusal information).

For example, when a predetermined input is executed on the input 75 of the user terminal 7, the processor 71a of the user terminal 7 recognizes the confirmation information. The processor 71a of the user terminal 7 issues a transmission command, which is used to transmit the confirmation information to the cloud server 3, to the information provider 74 of the user terminal 7. Thus, the confirmation signal corresponding to the confirmation information is transmitted from the information provider 74 of the user terminal 7 to the cloud server 3.

The user terminal 7 transmits terminal position information indicating position of the user terminal 7 to the cloud server 3 via the information provider 74 of the user terminal 7. The user terminal 7 is configured to be able to use GPS (Global Positioning System). The user terminal 7 further includes a GPS receiver 76. The GPS receiver 76 acquires the terminal position information from GPS satellites.

The user terminal 7 transmits the terminal position information which is acquired by the GPS receiver 76 to the cloud server 3 via the information provider 74 of the user terminal 7. For example, when the processor 71a of the user terminal 7 issues a transmission command to the information provider 74 of the user terminal 7, the terminal position information is transmitted from the information provider 74 of the user terminal 7 to the cloud server 3.

The user terminal 7 receives the watercraft position information from the cloud server 3 via the information receiver 73 of the user terminal 7. The watercraft position information is recorded in the memory 71b of the user terminal 7. The user terminal 7 reads the watercraft position information from the memory 71b of the user terminal 7 and displays the watercraft position information on the display 72 of the user terminal 7. For example, the user terminal 7 displays the watercraft position information together with the terminal position information on the display 72 of the user terminal 7.

The user terminal 7 receives the navigation distance information and the fuel consumption information from the cloud server 3 via the information receiver 73 of the user terminal 7. The navigation distance information and the fuel consumption information are recorded in the memory 71b of the user terminal 7. The navigation distance information and the fuel consumption information are read from the memory 71b of the user terminal 7 and displayed on the display 72 of the user terminal 7.

The user terminal 7 transmits a lock request signal to request the key lock of the watercraft 9 to the cloud server 3 via the information provider 74 of the user terminal 7. The user terminal 7 transmits an unlock request signal to request release of the key lock of the watercraft 9 to the cloud server 3 via the information provider 74 of the user terminal 7. The user terminal 7 transmits a navigation start signal and a navigation end signal to the cloud server 3 via the information provider 74 of the user terminal 7.

For example, when the user performs a predetermined input on the input 75 of the user terminal 7, the processor 71a of the user terminal 7 issues a transmission command, which is used to transmit the above signal to the cloud server 3, to the information provider 74 of the user terminal 7. Thus, the above signal is transmitted from the information provider 74 of the user terminal 7 to the cloud server 3.

The user terminal 7 receives the navigation distance information and the fuel consumption information from the cloud server 3 via the information receiver 73 of the user terminal 7.

The user terminal 7 records the navigation distance information and the fuel consumption information in the memory 71b of the user terminal 7. The user terminal 7 reads the navigation distance information and the fuel consumption information from the memory 71b of the user terminal 7 and displays them on the display 72 of the user terminal 7.

The watercraft 9 is configured to communicate with the cloud server 3. Each of the plurality of watercrafts 9a, 9b, 9c illustrated in FIG. 1 includes the following configuration. In the following, each of the watercraft 9a, 9b, 9c will be described with the word "watercraft 9". As shown in FIG. 2, the watercraft 9 includes processor circuitry 91 of the watercraft 9, the communicator 92, a watercraft position detector 93, and the engine operation detector 94.

The processor circuitry 91 of the watercraft 9 is provided on the watercraft 9. The processor circuitry 91 of the watercraft 9 processes various information on the watercraft 9. The processor circuitry 91 of the watercraft 9 controls the engine. The processor circuitry 91 of the watercraft 9 controls the communicator 92, a watercraft position detector 93, and the engine operation detector 94.

For example, the processor circuitry 91 of the watercraft 9 includes a processor 91a and a memory 91b. The processor 91a is, for example, a CPU. The processor 91a processes various information of the watercraft 9 based on the program recorded in the memory 91b. The processor 91a controls the communicator 92, the watercraft position detector 93, and the engine operation detector 94 based on the program recorded in the memory 91b.

The memory 91b records various information processed by the processor 91a and various programs executed by the processor 91a. The memory 91b includes a volatile memory such as RAM. The memory 91b includes a non-volatile memory such as a ROM.

The communicator 92 is provided on the watercraft 9. The communicator 92 provides the cloud server 3 with information and signals regarding the watercraft 9. For example, the communicator 92 transmits the information and the signals regarding the watercraft 9 to the cloud server 3.

The communicator 92 transmits the information and the signals regarding the watercraft 9 to the cloud server 3 based on commands of the processor 91a of the watercraft 9. Thus, the information of the watercraft 9 is recognized by the processor 31a of the cloud server 3 (described below). The information of the watercraft 9 is recorded in the memory 31b of the cloud server 3 (described below).

The communicator 92 provides the watercraft position information (described below) to the cloud server 3. For example, the communicator 92 transmits a signal corresponding to the watercraft position information (described below) to the cloud server 3.

When the engine operation is stopped, the communicator 92 transmits an engine operation stop signal indicating the engine operation stop to the cloud server 3. The communicator 92 provides the fuel remaining amount information to the cloud server 3. For example, the communicator 92 transmits a signal corresponding to the fuel remaining amount information to the cloud server 3.

The communicator 92 receives the information and the signals regarding the watercraft 9 from the cloud server 3. For example, the communicator 92 receives the information and the signals regarding the watercraft 9 from the cloud server 3.

When the communicator 92 receives the information and the signal regarding the watercraft 9, the processor 91a of the watercraft 9 recognizes the information and the signal regarding the watercraft 9. The information of the watercraft 9 is recorded in the memory 91b of the watercraft 9.

The communicator 92 receives a lock signal and an unlock signal from the cloud server 3. The lock signal is a signal to execute the key lock of the watercraft 9. The unlock signal is a signal to unlock the key lock of the watercraft 9. The communicator 92 receives a navigation permission signal from the cloud server 3. The navigation permission signal is a signal to permit the navigation of the watercraft 9.

The watercraft position detector 93 is provided on the watercraft 9. The watercraft position detector 93 detects the watercraft position information of the watercraft 9. The watercraft position detector 93 is, for example, a GPS receiver. The watercraft position detector 93 acquires watercraft position information from GPS satellites. The watercraft position information acquired by the watercraft position detector 93 is transmitted from the communicator 92 described above to the cloud server 3. Specifically, the processor 91a of the watercraft 9 issues a transmission command, which is used to transmit the watercraft position information to the cloud server 3, to the communicator 92.

The engine operation detector 94 is provided on the watercraft 9. The engine operation detector 94 detects the operating state of the engine. Engine operation information indicating the operating state of the engine is recognized by the processor circuitry 91 of the watercraft 9. For example, the engine operation information is recognized by the processor 91a of the watercraft 9 and recorded in the memory 91b of the watercraft 9. For example, the engine operation detector 94 is a sensor that detects the engine rotation speed. In this case, the engine operation information includes time series data of the engine rotation speed.

The engine rotation speed detected by the engine operation detector 94 is monitored by the processor 91a of the watercraft 9. For example, when the processor 91a of the watercraft 9 recognizes the engine stop based on the engine rotation speed detected by the engine operation detector 94, the engine operation stop signal is transmitted from the above communicator 92 to the cloud server 3. Specifically, the processor 91a of the watercraft 9 issues a transmission command, which is used to transmit the engine operation stop signal to the cloud server 3, to the communicator 92.

The cloud server 3 is used to rent the owner's watercraft 9 to the user. The cloud server 3 is configured or programmed to communicate with the owner terminal 5, the user terminal 7, and the watercraft 9. The cloud server 3 is used as a computer that manages the owner terminal 5, the user terminal 7, and the watercraft 9.

As shown in FIG. 2, the cloud server 3 includes a processor circuitry 31 of the cloud server 3, a storage 32 of the cloud server 3 (an example of a recorder), and an information receiver 33 of the cloud server 3 (an example of an information receiver). An information provider 34 of the cloud server 3 (an example of an information provider) is provided. The cloud server 3 may include an input of the cloud server 3 (not illustrated).

The processor circuitry 31 of the cloud server 3 processes various information in the cloud server 3. The processor circuitry 31 of the cloud server 3 processes the information received by the information receiver 33 of the cloud server 3.

For example, the processor circuitry 31 of the cloud server 3 processes the information received from the owner terminal 5 and the information received from the user terminal 7. The processor circuitry 31 of the cloud server 3 controls the information receiver 33 of the cloud server 3 and the information provider 34 of the cloud server 3.

For example, the processor circuitry 31 of the cloud server 3 includes the processor 31*a* and a memory 31*b* (an example of a recorder). The processor 31*a* is, for example, a CPU. The processor 31*a* processes various information based on the program recorded in the memory 31*b*. The processor 31*a* controls the information receiver 33 of the cloud server 3 and the information provider 34 of the cloud server 3 based on the program recorded in the memory 31*b*.

When the cloud server 3 includes an input (not illustrated), the input of the cloud server 3 accepts the input of a server administrator. The input information and the input signal of the input of the cloud server 3 are recognized by the processor 31*a*.

The memory 31*b* records various information processed by the processor 31*a* and various programs executed by the processor 31*a*. The memory 31*b* includes a volatile memory such as RAM. The memory 31*b* includes a non-volatile memory such as a ROM.

The storage 32 of the cloud server 3 records the above various information and various programs. The storage 32 of the cloud server 3 includes a storage such as a hard disk and/or SSD. The storage 32 of the cloud server 3 is connected to the processor circuitry 31 of the cloud server 3. The storage 32 of the cloud server 3 may be included in the processor circuitry 31 of the cloud server 3.

For example, the storage 32 of the cloud server 3 is used as a database. The storage 32 of the cloud server 3 may be used as an auxiliary storage for the processor circuitry 31, or may be used as an external storage for the processor circuitry 31.

In the following description, the expressions of "the processor 31*a* of the cloud server 3 records various information in the memory" and "the processor 31*a* of the cloud server 3 reads various information from the memory" are used. These expressions may interpret "the memory" as "the storage". In other words, at least one of the processor 31*a* of the cloud server 3 and the storage 32 of the cloud server 3 is used as a recorder.

The information receiver 33 of the cloud server 3 acquires information and signals from the owner terminal 5, the user terminal 7, and the watercraft 9. For example, the information receiver 33 of the cloud server 3 receives the information and the signals from the owner terminal 5, the user terminal 7, and the watercraft 9.

The information and signals received from the owner terminal 5, the user terminal 7, and the watercraft 9 are recognized by the processor 31*a* of the cloud server 3. The information received from the owner terminal 5, the user terminal 7, and the watercraft 9 is recorded in the memory 31*b* of the cloud server 3.

For example, the information receiver 33 of the cloud server 3 receives the watercraft position information, which is detected by the watercraft position detector 93 of the watercraft 9, from the communicator 92 of the watercraft 9. The watercraft position information is recorded in the memory 31*b* of the cloud server 3. The information receiver 33 of the cloud server 3 receives the terminal position information of the user terminal 7 from the user terminal 7. The terminal position information is recorded in the memory 31*b* of the cloud server 3.

The information receiver 33 of the cloud server 3 receives the lock request signal and the unlock request signal of the watercraft 9 from the user terminal 7. The lock request signal and the unlock request signal of the watercraft 9 are recognized by the processor 31*a* of the cloud server 3.

The information receiver 33 of the cloud server 3 receives the engine operation stop signal detected by the engine operation detector 94 of the watercraft 9 from the communicator 92. The engine operation stop signal is recognized by the processor 31*a* of the cloud server 3. An operation stop information corresponding to the engine operation stop signal is recorded in the memory 31*b* of the cloud server 3.

The information receiver 33 of the cloud server 3 receives the fuel remaining amount information of the watercraft 9 from the watercraft 9. For example, the information receiver 33 of the cloud server 3 receives the fuel remaining amount information of the watercraft 9 from the communicator 92. The fuel remaining amount information is recognized by the processor 31*a* of the cloud server 3. The fuel remaining amount information is recorded in the memory 31*b* of the cloud server 3.

The information receiver 33 of the cloud server 3 receives the maintenance information of the watercraft 9 from the owner terminal (an example of the maintenance information providing terminal). For example, the information receiver 33 of the cloud server 3 receives the maintenance information of the watercraft 9 from the owner terminal. The maintenance information is recognized by the processor 31*a* of the cloud server 3. The maintenance information is recorded in the memory 31*b* of the cloud server 3.

The information receiver 33 of the cloud server 3 receives the borrowing request information and the confirmation information from the user terminal 7. The information receiver 33 of the cloud server 3 receives the answer information from the owner terminal 5. The borrowing request information, the confirmation information, and the answer information are recognized by the processor 31*a* of the cloud server 3. The borrowing request information, the confirmation information, and the answer information are recorded in the memory 31*b* of the cloud server 3.

The information receiver 33 of the cloud server 3 receives the information request signal, the navigation start signal, and the navigation end signal from the user terminal 7. The information request signal, the navigation start signal, and the navigation end signal are recognized by the processor 31*a* of the cloud server 3.

The information provider 34 of the cloud server 3 provides the information and the signals to the owner terminal 5, the user terminal 7, and the watercraft 9. The information provider 34 of the cloud server 3 transmits the information and the signals to the owner terminal 5, the user terminal 7, and the watercraft 9.

For example, the processor 31*a* of the cloud server 3 reads the information, which is transmitted to the owner terminal 5, the user terminal 7, and the watercraft 9, from the memory 31*b* of the cloud server 3.

The processor 31*a* of the cloud server 3 issues a command, which is used to transmit the information and the signals to the owner terminal 5, the user terminal 7, and the watercraft 9, to the information provider 34 of the cloud server 3, after the processor 31a of the cloud server 3 executes an encryption process for the information and the signals.

The processor circuitry 31 of the cloud server 3 acquires the rental condition information that the information receiver 33 of the cloud server 3 receives from the information provider 54 of the owner terminal 5. For example, the processor 31a of the cloud server 3 recognizes the rental condition information. The processor 31a of the cloud server 3 records the rental condition information in the memory 31b of the cloud server 3.

The processor circuitry 31 of the cloud server 3 generates the borrowing input list based on the rental condition information. For example, the processor 31a of the cloud server 3 reads the rental condition information of at least one owner from the memory 31b of the cloud server 3. The processor 31a of the cloud server 3 generates the borrowing input list based on at least one rental condition information.

The processor 31a of the cloud server 3 records the borrowing input list in the memory 31b of the cloud server 3. In the present preferred embodiment, an example is shown in which the rental condition information of at least one owner is the rental condition information of a plurality of owners.

The processor circuitry 31 of the cloud server 3 provides the user terminal 7 with the plurality of rental condition information and the borrowing input list. For example, the processor circuitry 31 of the cloud server 3 transmits the plurality of rental condition information and the borrowing input list to the user terminal 7. When the maintenance information is received from the owner terminal, the processor circuitry 31 of the cloud server 3 transmits the plurality of rental condition information and the borrowing input list to the user terminal 7.

Specifically, when the information receiver 33 of the cloud server 3 receives the maintenance information from the information provider 54 of the owner terminal 5, the processor 31a of the cloud server 3 records the maintenance information in the memory 31b of the cloud server 3. After that, the processor 31a of the cloud server 3 issues a transmission command, which is used to transmit the plurality of rental condition information and the borrowing input list to the user terminal 7, to the information provider 34 of the cloud server 3.

The processor circuitry 31 of the cloud server 3 acquires the borrowing request information that the information receiver 33 of the cloud server 3 receives from the information provider 74 of the user terminal 7.

For example, the processor 31a of the cloud server 3 recognizes the borrowing request information. The processor 31a of the cloud server 3 records the borrowing request information in the memory 31b of the cloud server 3.

As described above, the borrowing request information includes the user information, the watercraft information, the owner information, the user's desired rental date-time information, and the driver request information.

The processor circuitry 31 of the cloud server 3 provides the owner terminal 5 with the answer input information corresponding to the borrowing request information. For example, the processor circuitry 31 of the cloud server 3 transmits the answer input information, which is used to cause the owner to input the answer to the borrowing request information, to the owner terminal 5.

For example, the processor 31a of the cloud server 3 reads the item information corresponding to the permission item and the item information corresponding to the refusal item from the memory 31b of the cloud server 3. The processor 31a of the cloud server 3 issues a transmission command, which is used to transmit the above item information to the owner terminal 5, to the information provider 34 of the cloud server 3.

The processor circuitry 31 of the cloud server 3 acquires the answer information that the information receiver 33 of the cloud server 3 receives from the information provider 54 of the owner terminal 5. For example, the processor 31a of the cloud server 3 recognizes the answer information. The processor 31a of the cloud server 3 records the answer information in the memory 31b of the cloud server 3. As mentioned above, the answer information includes the permission information or the refusal information.

The processor circuitry 31 of the cloud server 3 provides the answer information, which corresponds to the answer input information, to the user terminal 7. For example, the processor circuitry 31 of the cloud server 3 transmits the answer information to the user terminal 7. For example, the processor 31a of the cloud server 3 reads the answer information from the memory 31b of the cloud server 3. The processor 31a of the cloud server 3 issues a transmission command, which is used to transmit the answer information to the user terminal 7, to the information provider 34 of the cloud server 3.

The processor circuitry 31 of the cloud server 3 acquires the confirmation information that the information receiver 33 of the cloud server 3 receives from the information provider 74 of the user terminal 7. For example, the processor 31a of the cloud server 3 recognizes the confirmation information. The processor 31a of the cloud server 3 records the confirmation information in the memory 31b of the cloud server 3.

The processor circuitry 31 of the cloud server 3 transmits the contract information, which indicates the establishment or non-establishment of the contract between the user and the owner, to the owner terminal 5 and the user terminal 7.

For example, when the information receiver 33 of the cloud server 3 acquires the confirmation information, the processor 31a of the cloud server 3 generates the contract information based on the borrowing request information (the user information, the watercraft information, the owner information, the user's desired rental date-time information, and the driver request information) and the answer information (the permission information or the refusal information).

The processor 31a of the cloud server 3 records the contract information in the memory 31b of the cloud server 3. The processor 31a of the cloud server 3 issues a transmission command, which is used to transmit the contract information to the owner terminal 5 and the user terminal 7, to the information provider 34 of the cloud server 3.

The contract information includes the user information, the user's desired rental date-time information, the watercraft information, the driver request information, and the permission information or the refusal information. The user recognizes the contract information regarding borrowing based on the contract information. The owner recognizes the contract information regarding the rental matter based on the contract information.

The processor circuitry 31 of the cloud server 3 provides the user terminal 7 with the watercraft position information received from the communicator 92 of the watercraft 9. For example, the processor circuitry 31 of the cloud server 3 transmits the watercraft position information that the information receiver 33 of the cloud server 3 receives from the communicator 92 of the watercraft 9, to the user terminal 7.

For example, the processor 31a of the cloud server 3 issues a transmission command, which is used to transmit the watercraft position information to the user terminal 7, to the information provider 34 of the cloud server 3. The watercraft position information transmitted to the user terminal 7 is displayed on the user terminal 7. Thus, the position of the watercraft 9 is notified to the user.

The processor circuitry 31 of the cloud server 3 transmits the unlock signal to unlock the key lock of the watercraft 9 to the watercraft 9. For example, the processor 31a of the cloud server 3 issues a command, which is used to transmit the unlock signal to the communicator 92 of the watercraft 9, to the information provider 34 of the cloud server 3.

Specifically, the processor 31a of the cloud server 3 issues the command, which is used to transmit the unlock signal to the communicator 92 of the watercraft 9, to the information provider 34 of the cloud server 3 when the user terminal 7 determines that the user terminal 7 has approached the watercraft 9 based on the terminal position information and the watercraft position information. Thus, the key lock of the watercraft 9 is released. Whether or not the user terminal 7 has approached the watercraft 9 is determined by whether or not the distance between the user terminal 7 and the watercraft 9 is equal to or less than a predetermined distance.

The processor circuitry 31 of the cloud server 3 transmits the lock signal to execute the key lock of the watercraft 9 based on the lock request signal received from the information provider 74 of the user terminal 7 by the information receiver 33 of the cloud server 3.

For example, when the processor 31a of the cloud server 3 recognizes the lock request signal, the command, which transmits the lock signal to the communicator 92 of the watercraft 9, is issued to the information provider 34 of the cloud server 3. Thus, the key lock of the watercraft 9 is executed.

When the information receiver 33 of the cloud server 3 receives the lock request signal from the communicator 92 of the watercraft 9 during navigation of the watercraft 9, the processor circuitry 31 of the cloud server 3 regulates the transmission of the lock signal to the watercraft 9.

For example, the processor 31a of the cloud server 3 determines whether or not the watercraft 9 is navigating based on the watercraft position information. The processor 31a of the cloud server 3 regulates the transmission command for transmitting the lock signal to the communicator 92 of the watercraft 9 when it is determined that the watercraft 9 is navigating based on the watercraft position information. The processor 31a of the cloud server 3 may determine whether or not the watercraft 9 is navigating based on the engine operation information.

The processor 31a of the cloud server 3 determines whether or not the watercraft 9 separates from a shore by a predetermined distance or more based on the watercraft position information, and determines whether or not the engine has stopped based on the engine operation information.

In this case, the processor 31a of the cloud server 3 regulates the transmission command for transmitting the lock signal to the communicator 92 of the watercraft 9, when the watercraft 9 recognizes that the engine stops in a state where the watercraft 9 separates from the shore by a predetermined distance or more.

When the information receiver 33 of the cloud server 3 receives the lock request signal from the communicator 92 of the watercraft 9 in a state where the engine is stopped during navigation of the watercraft 9, the processor circuitry 31 of the cloud server 3 regulates the transmission of the lock signal to the watercraft 9.

For example, the processor 31a of the cloud server 3 determines whether or not the watercraft 9 is navigating based on the watercraft position information.

When the information receiver 33 of the cloud server 3 receives the engine operation stop signal from the communicator 92 of the watercraft 9 and receives the lock request signal from the information provider 74 of the user terminal 7, the processor 31a of the cloud server 3 regulates the transmission of the lock signal to the communicator 92 of the watercraft 9. Thus, when the watercraft 9 is stopped during navigation, the key lock of the watercraft 9 is restricted.

The processor circuitry 31 of the cloud server 3 calculates a navigation distance of the watercraft 9 based on the watercraft position information which is acquired by the watercraft position detector 93. For example, the processor 31a of the cloud server 3 calculates the navigation distance of the watercraft 9 based on the watercraft position information which is received from the communicator 92 of the watercraft 9 by the information receiver 33 of the cloud server 3.

The navigation distance of the watercraft 9 may be calculated as follows. The processor circuitry 31 of the cloud server 3 calculates the navigation distance of the watercraft 9 based on the fuel remaining amount information. For example, the processor 31a of the cloud server 3 calculates the navigation distance of the watercraft 9 based on the fuel remaining amount information which is received from the communicator 92 of the watercraft 9 by the information receiver 33 of the cloud server 3.

Specifically, the fuel remaining amount information includes the fuel remaining amount information before navigation and the fuel remaining amount information after navigation. The processor 31a of the cloud server 3 calculates the navigation distance of the watercraft 9 based on the difference between the fuel remaining amount information before navigation and the fuel remaining amount information after navigation.

The difference between the fuel remaining amount information before navigation and the fuel remaining amount information after navigation corresponds to the fuel consumption information. The table information showing a relationship between the fuel consumption information and the navigation distance is recorded in the memory 31b of the cloud server 3.

The processor circuitry 31 of the cloud server 3 provides the navigation distance information to the user terminal 7 and the owner terminal 5. For example, the processor circuitry 31 of the cloud server 3 transmits the navigation distance information to the user terminal 7 and the owner terminal 5.

The processor 31a of the cloud server 3 issues a command, which is used to transmit the navigation distance information to the user terminal 7 and the owner terminal 5, to the information provider 34 of the cloud server 3. Thus, the navigation distance information is displayed on the user terminal 7 and the owner terminal 5.

The processor circuitry 31 of the cloud server 3 transmits the fuel consumption information to the user terminal 7 and the owner terminal 5. For example, the processor 31a of the cloud server 3 issues a command, which is used to transmit the fuel consumption information to the user terminal 7 and the owner terminal 5, to the information provider 34 of the cloud server 3. The fuel consumption information is displayed on the user terminal 7 and the owner terminal 5.

Thus, the user and the owner are able to easily understand the fuel consumption information.

At this time, fuel cost corresponding to the fuel consumption information may be displayed on the user terminal 7 and the owner terminal 5. In this case, the fuel cost is calculated by the processor circuitry 31 of the cloud server 3 based on rate information and the fuel consumption information acquired by the processor circuitry 31 of the cloud server 3. The rate information may be directly input by the administrator of the cloud server 3 or may be acquired from another server or the like.

In addition, a charge according to engine usage status may be displayed on the user terminal 7 and the owner terminal 5 based on engine usage status information such as engine operating time, engine speed during operation (for example, average rotation speed), and engine usage horsepower during operation (average horsepower).

In this case, the charge is calculated by the processor circuitry 31 of the cloud server 3 based on a table data showing a relationship between the charge and the engine usage status information.

Here, the processing mode of the watercraft rental system 1 including the above configuration will be described with reference to the flowcharts of FIGS. 3A to 6E.

Figure 3A:
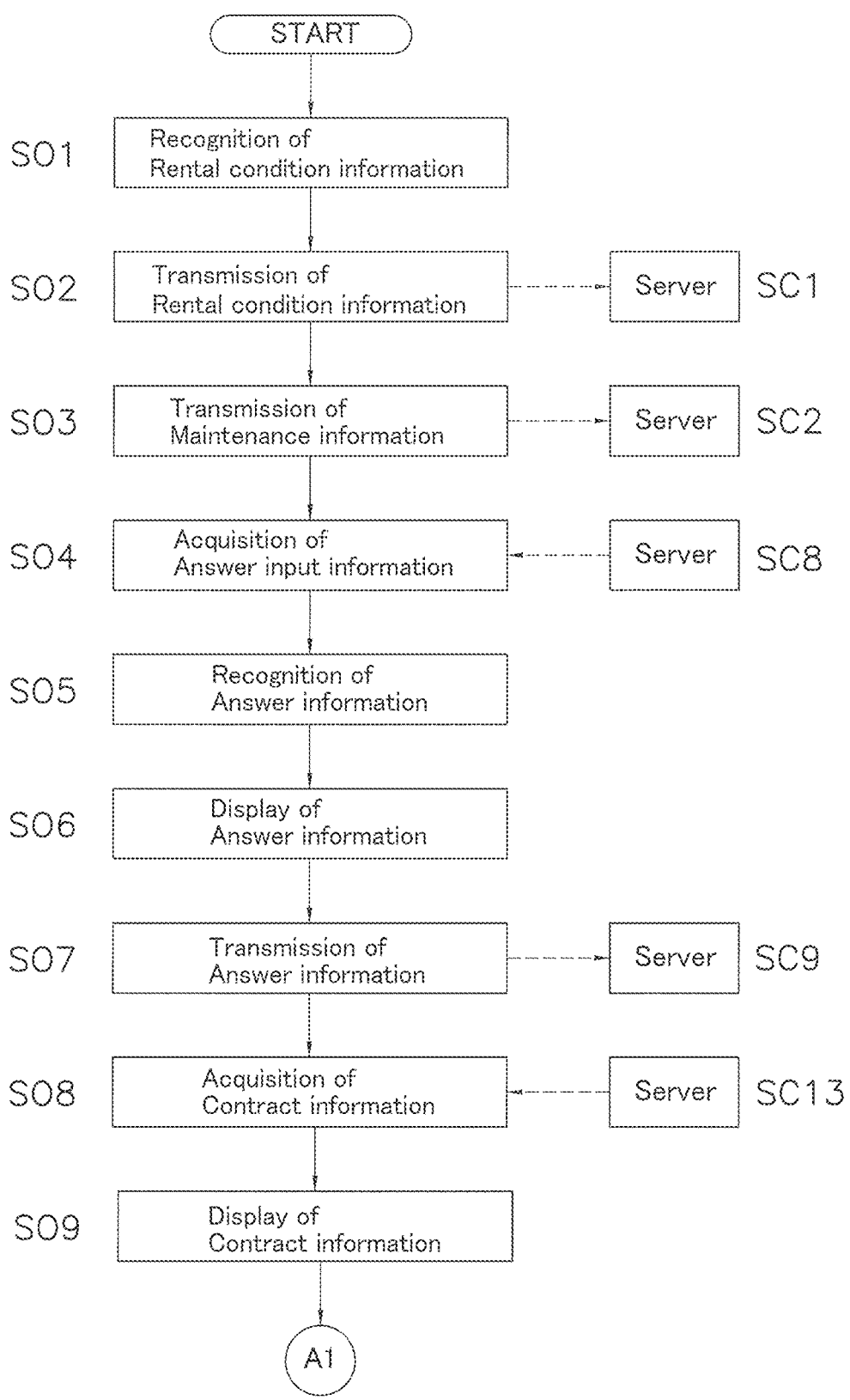
FIG. 3A is a flowchart which shows a process performed on an owner terminal.
Figure 3B:
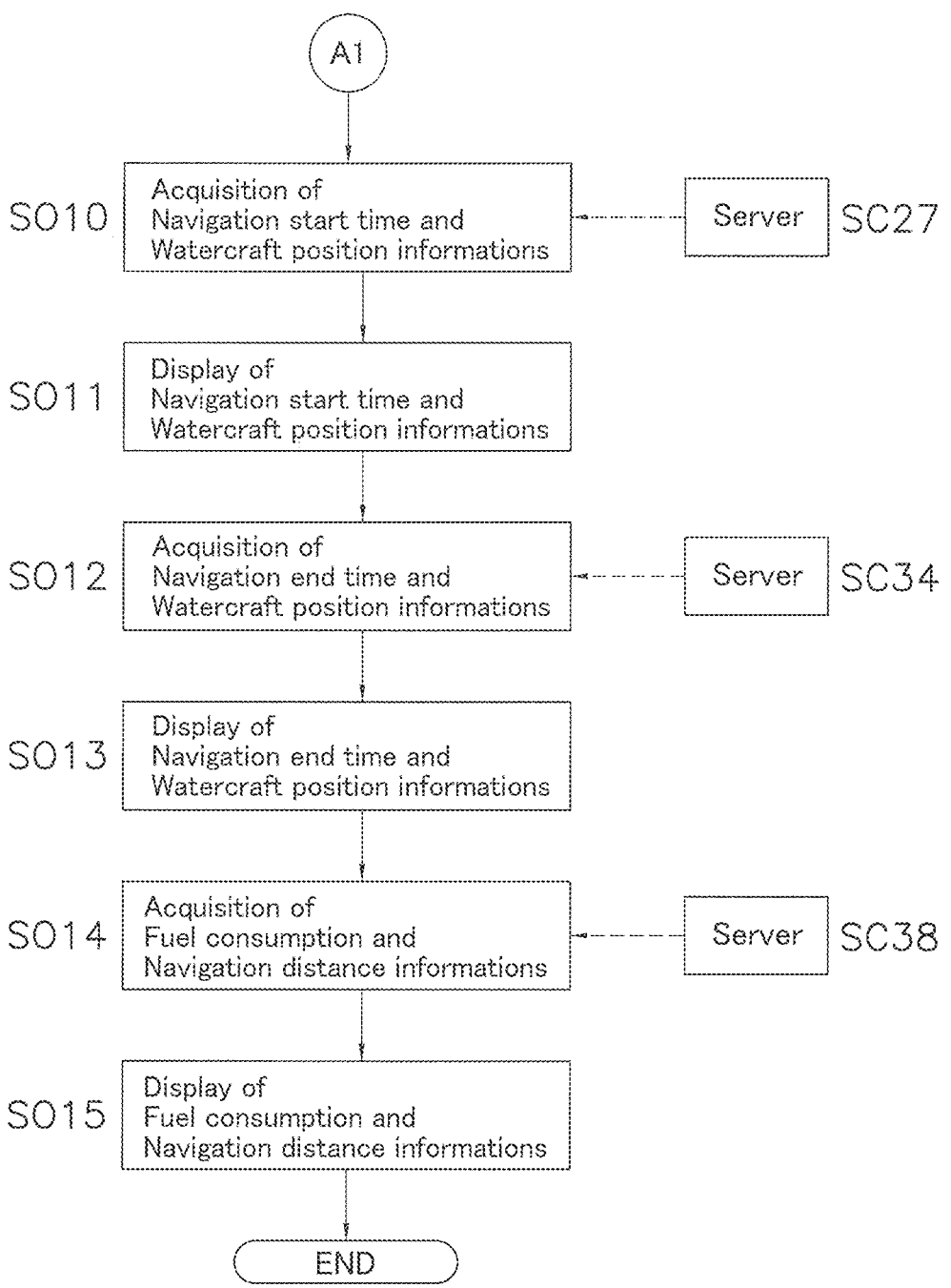
FIG. 3B is an additional flowchart which shows the process performed on the owner terminal.
Figure 4A:
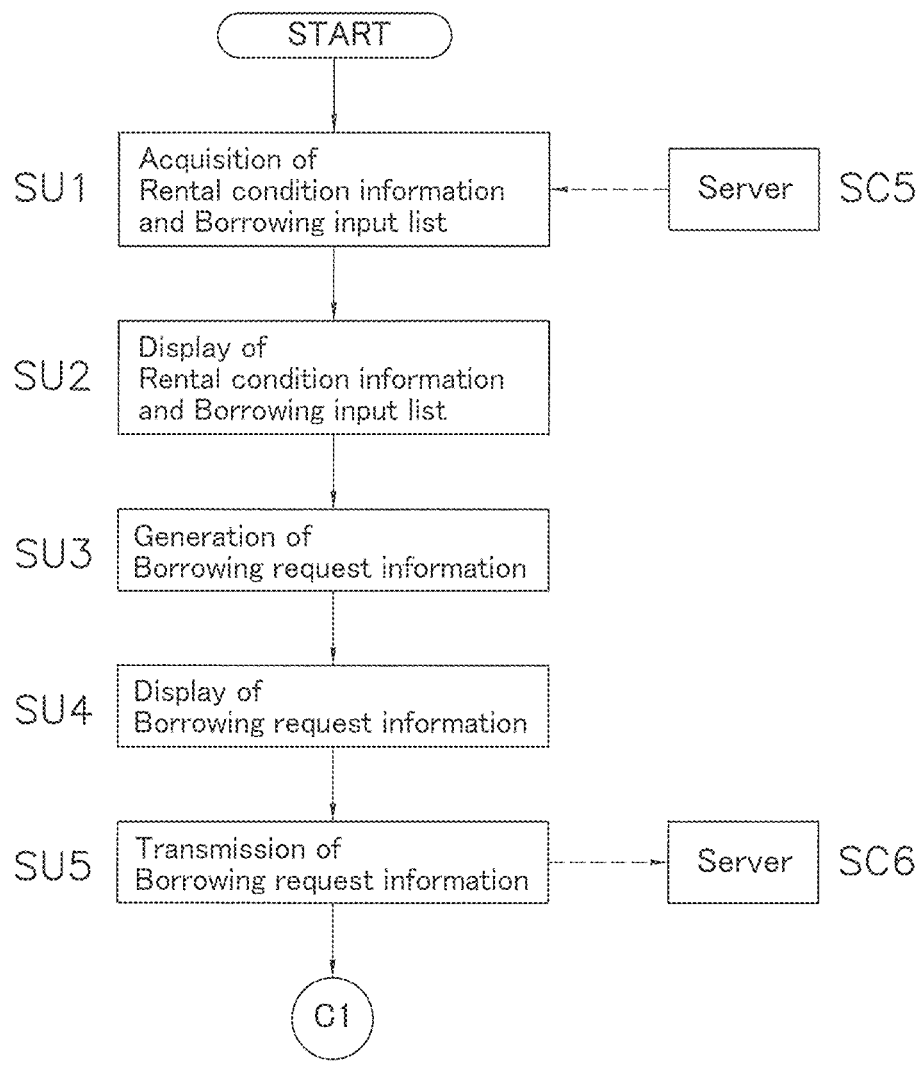
FIG. 4A is a flowchart which shows a process performed on a user terminal.
Figure 4B:
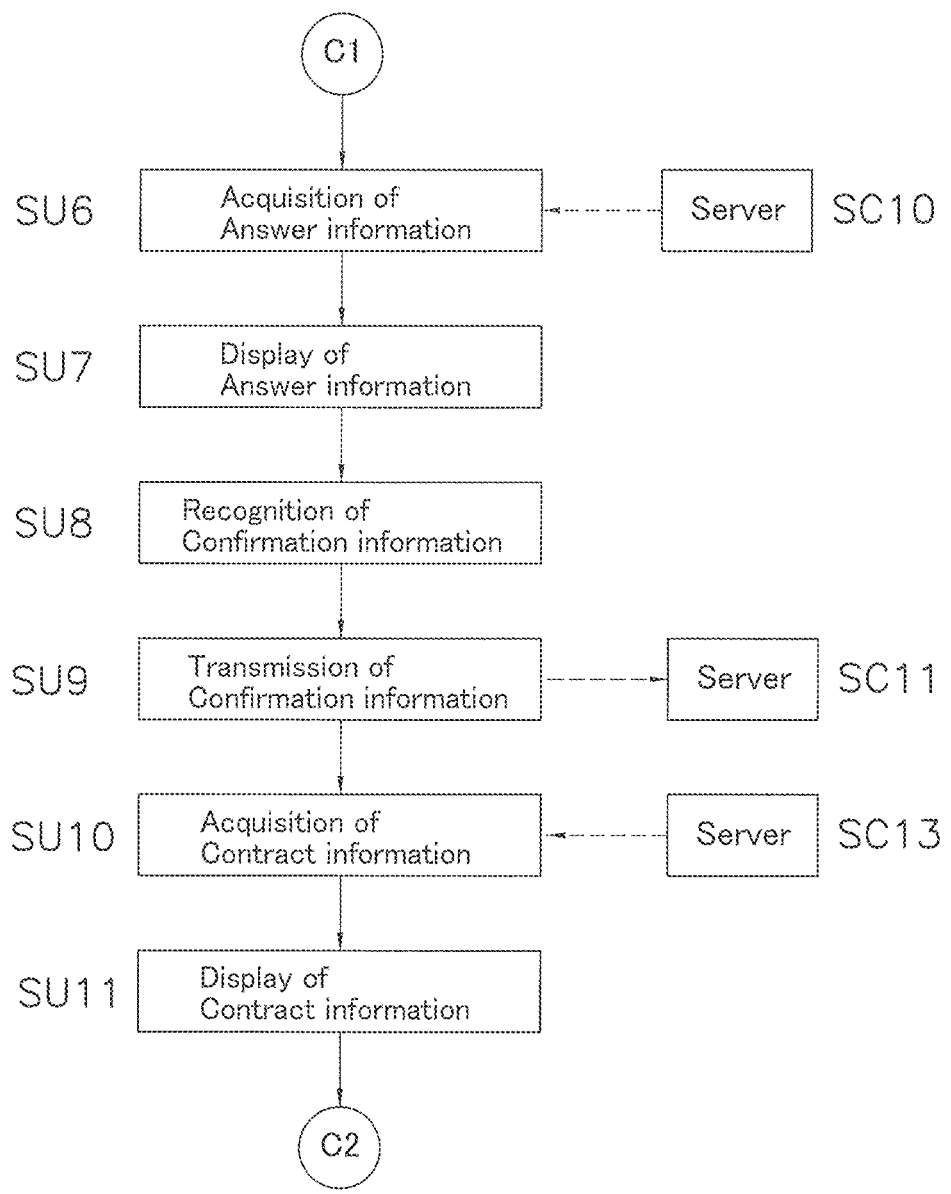
FIG. 4B is an additional flowchart which shows the process performed on the user terminal.
Figure 4C:
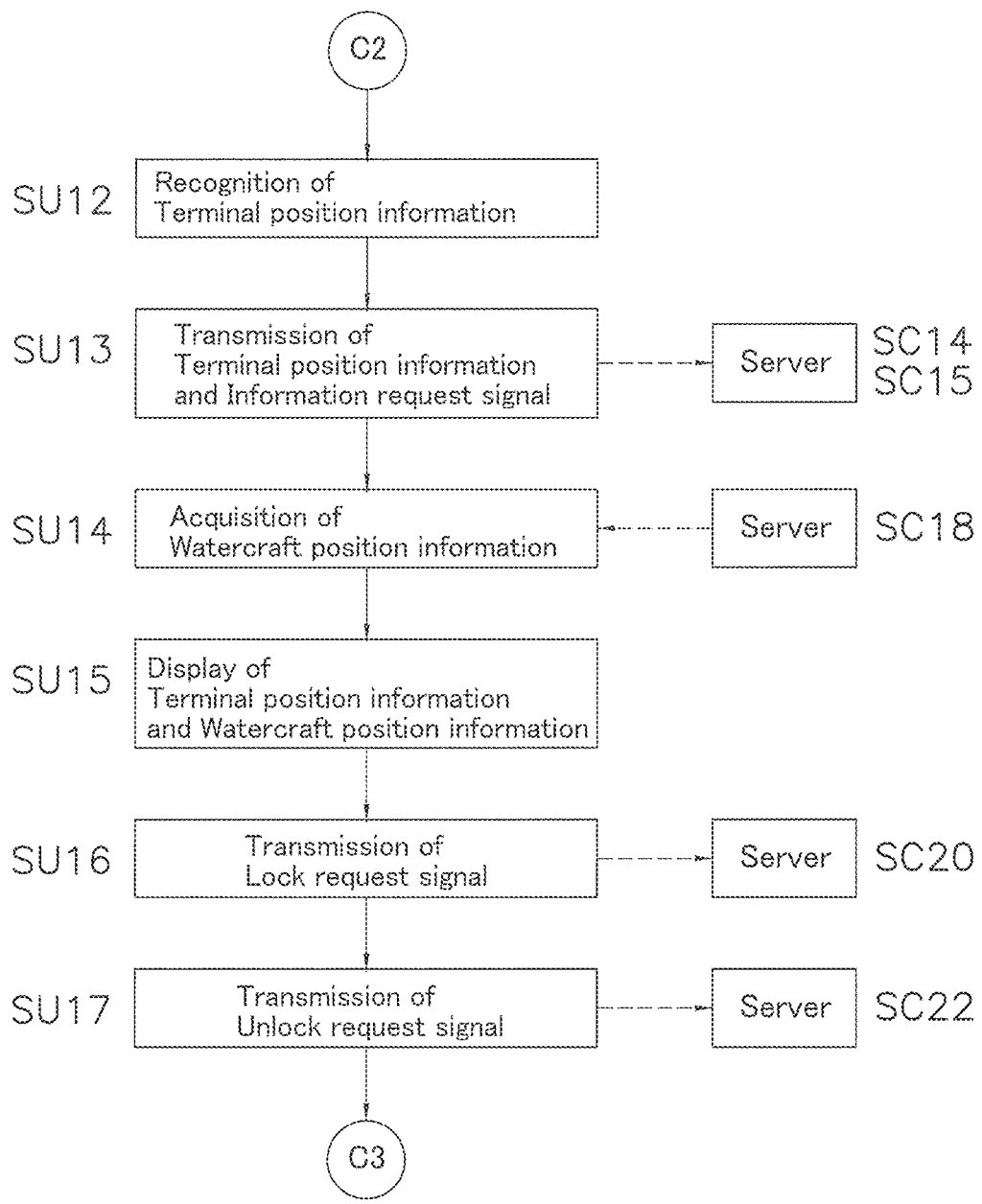
FIG. 4C is an additional flowchart which shows the process performed on the user terminal.
Figure 4D:
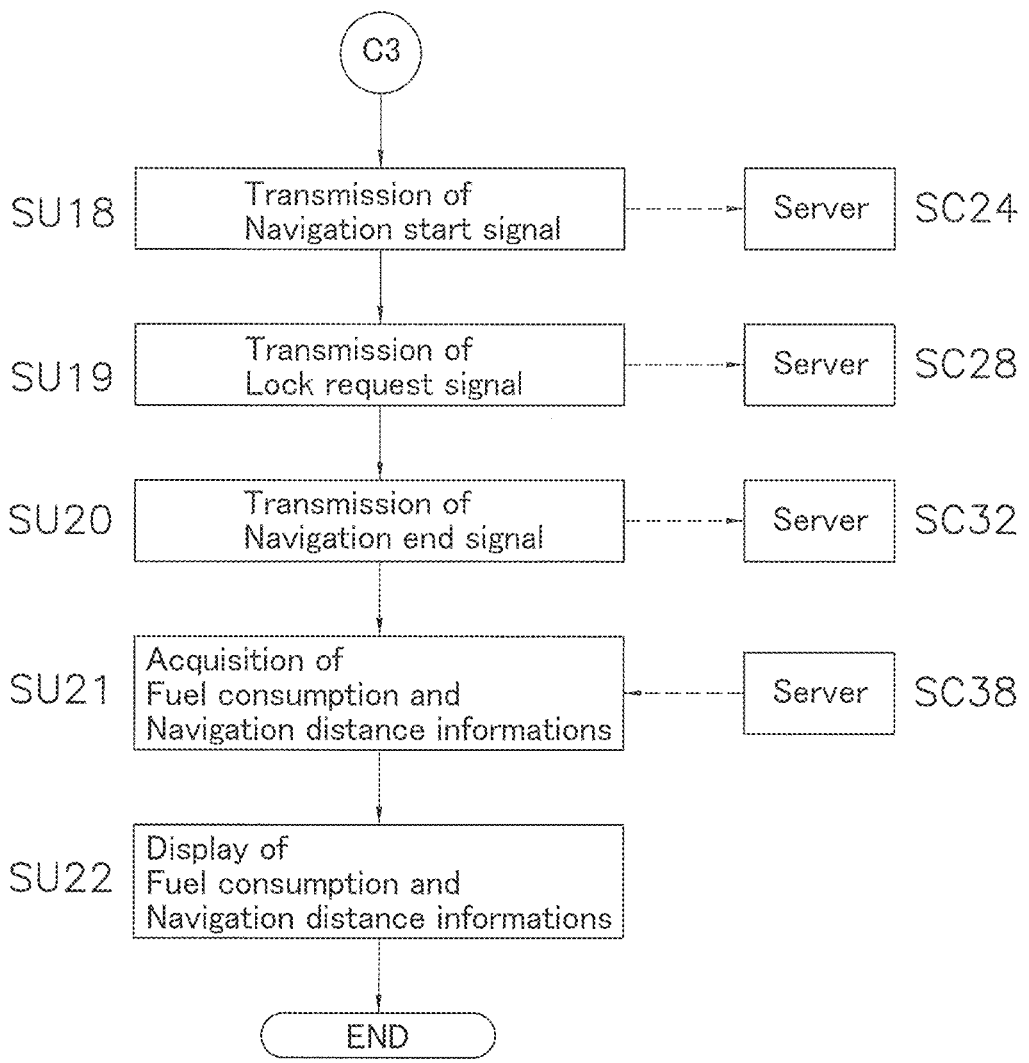
FIG. 4D is an additional flowchart which shows the process performed on the user terminal.
Figure 5:
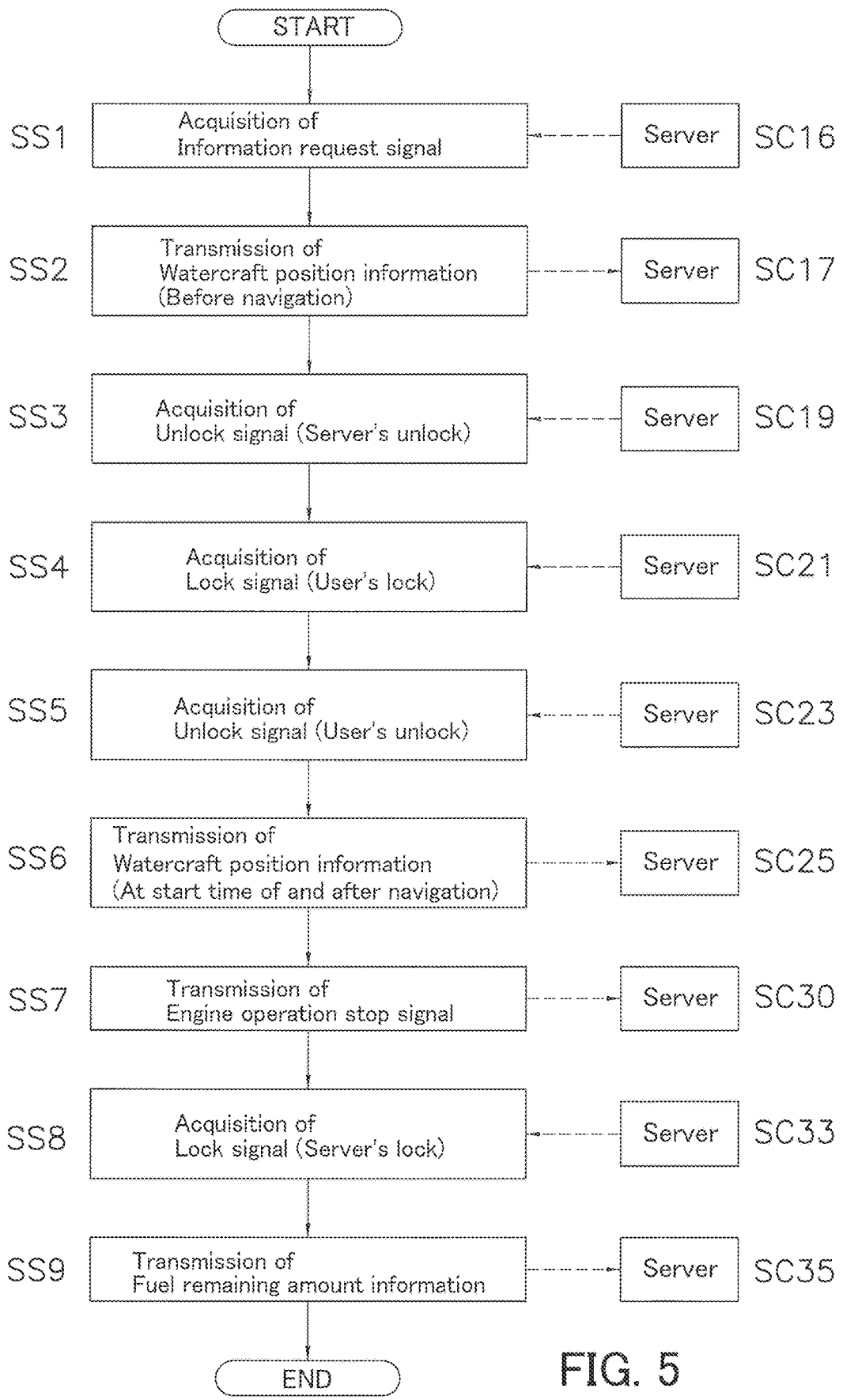
FIG. 5 is a flowchart which shows a process performed on the watercraft.
Figure 6A:
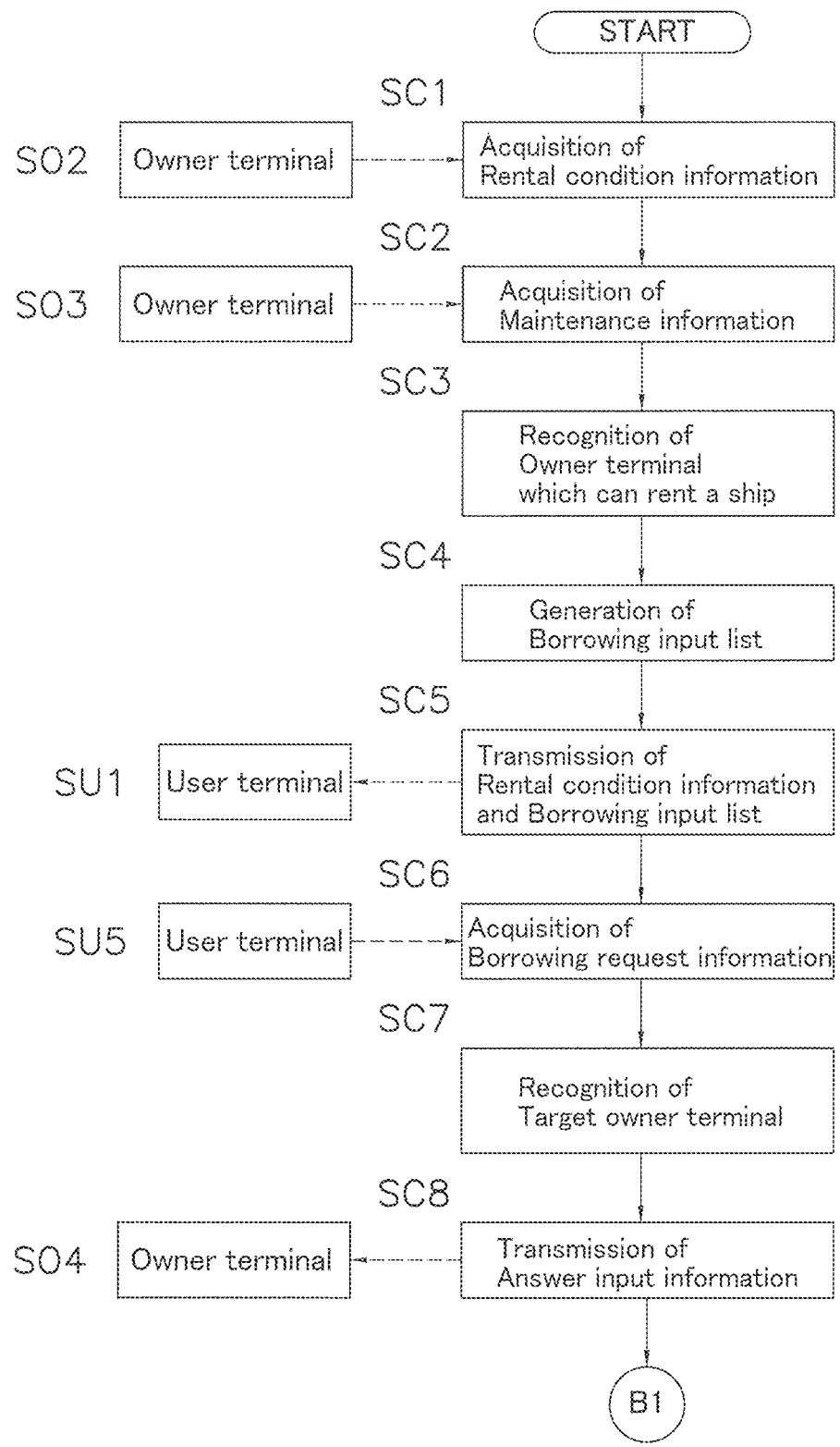
FIG. 6A is a flowchart which shows a process performed on a cloud server.
Figure 6B:
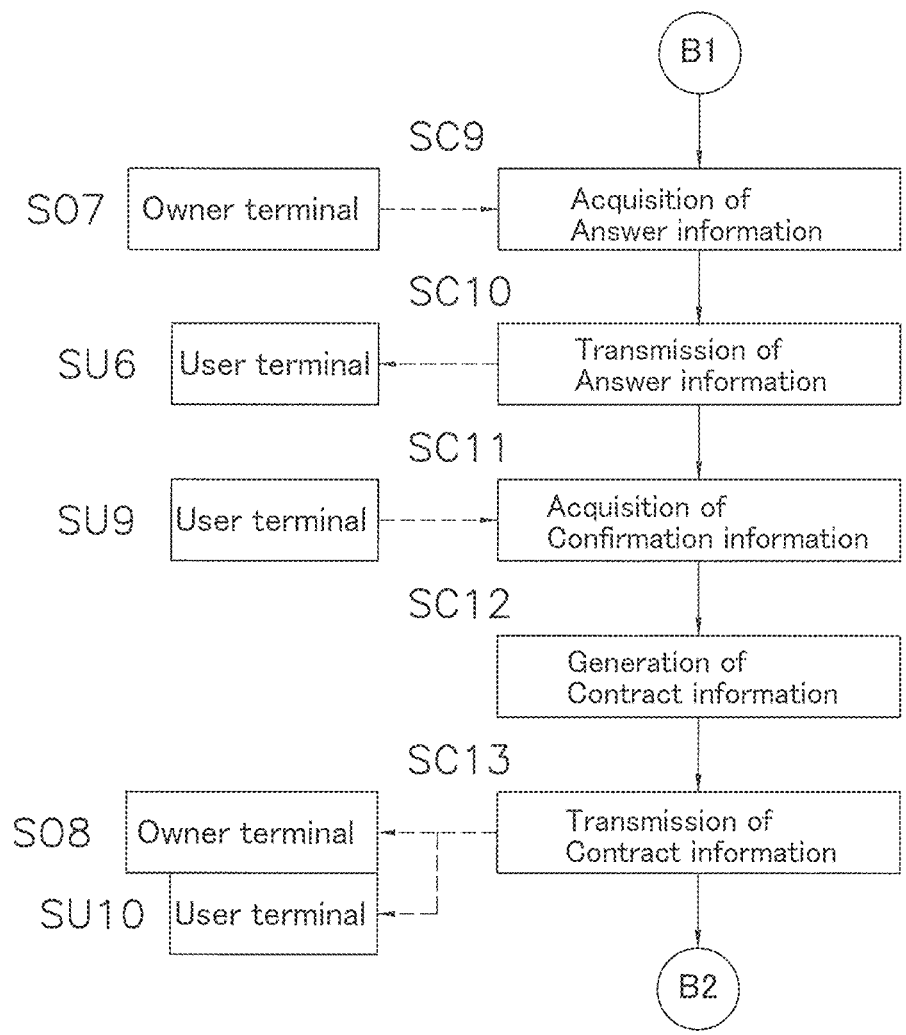
FIG. 6B is an additional flowchart which shows the process performed on the cloud server.
Figure 6C:
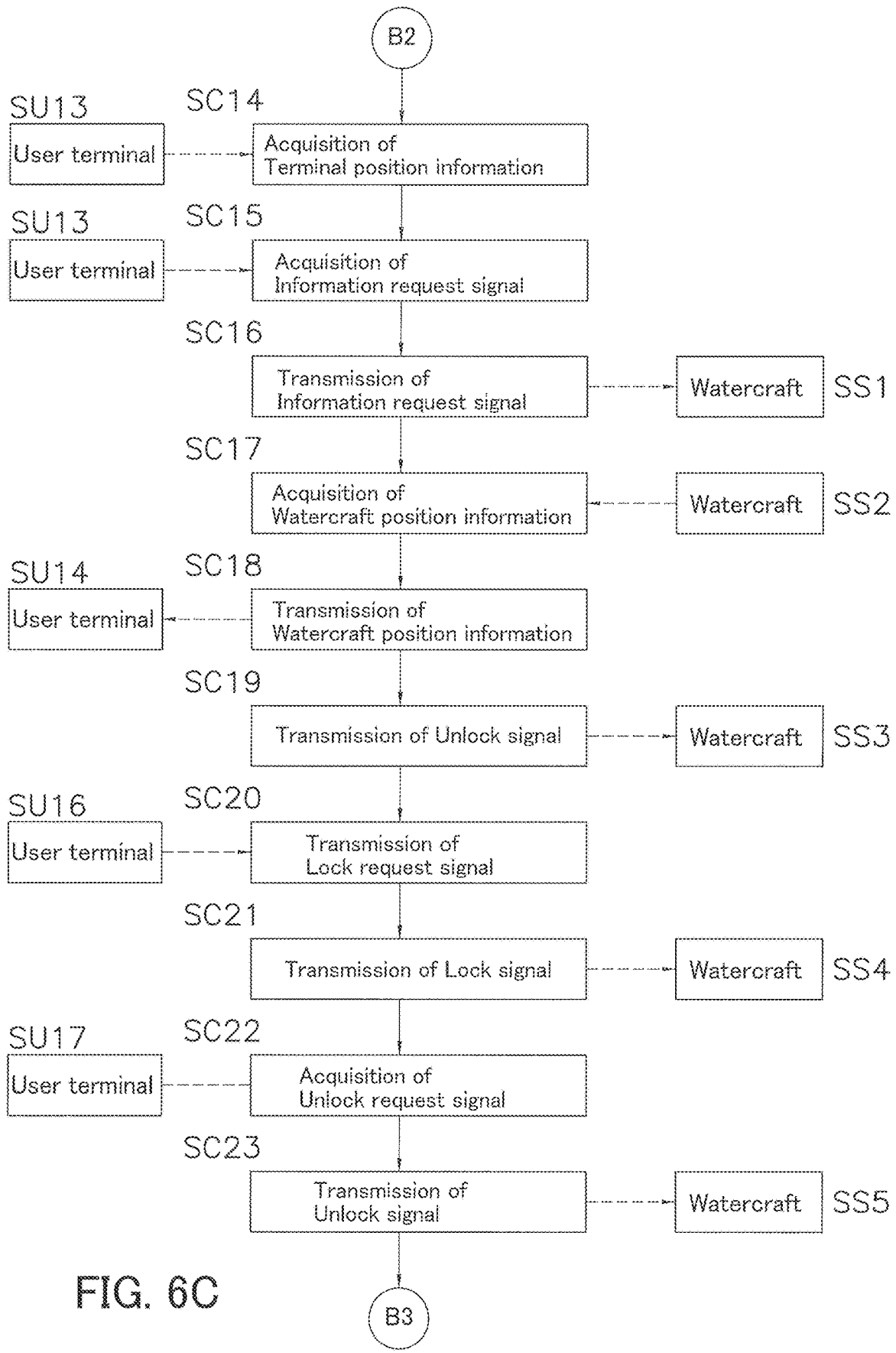
FIG. 6C is an additional flowchart which shows the process performed on the cloud server.
Figure 6D:
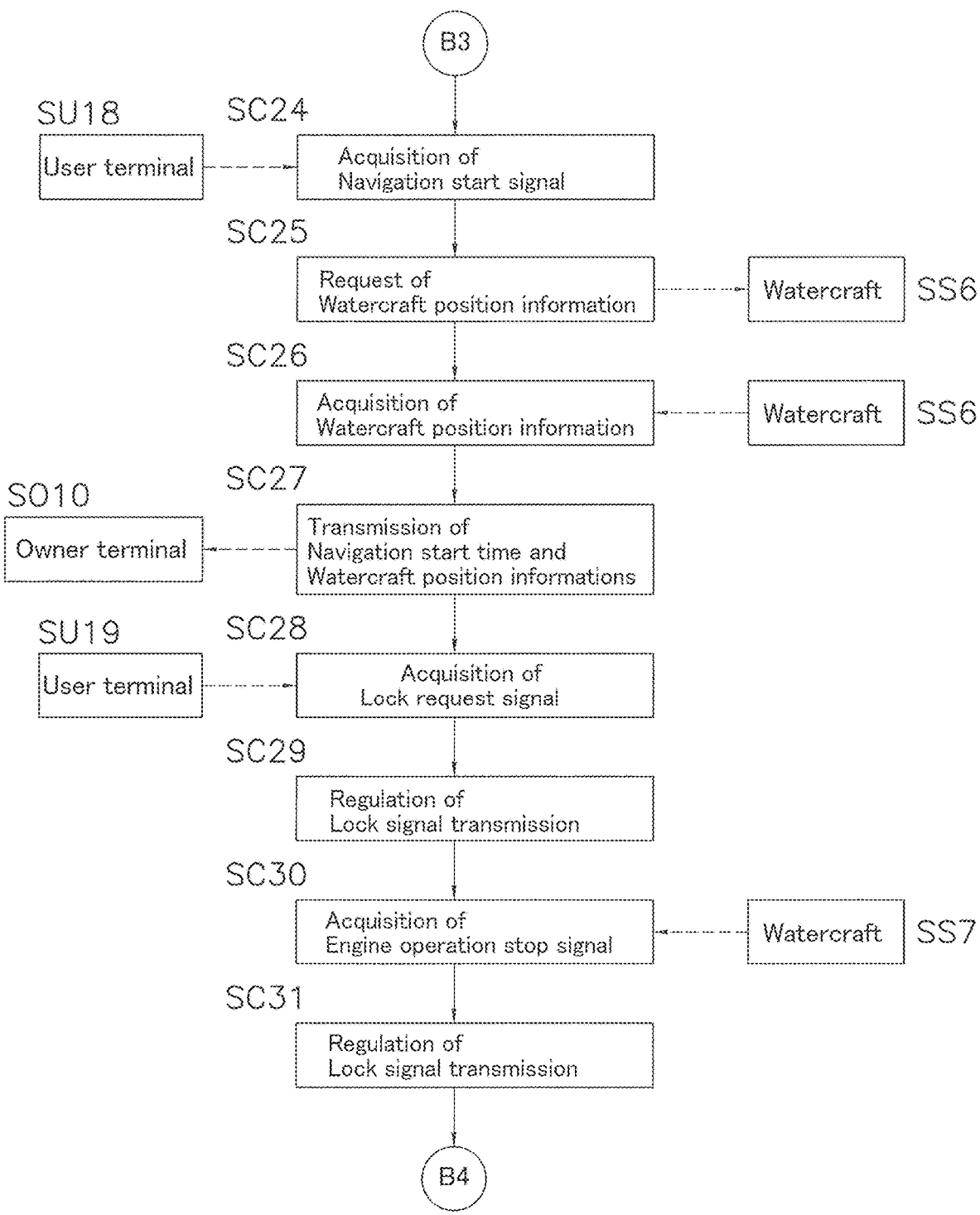
FIG. 6D is an additional flowchart which shows the process performed on the cloud server.
Figure 6E:
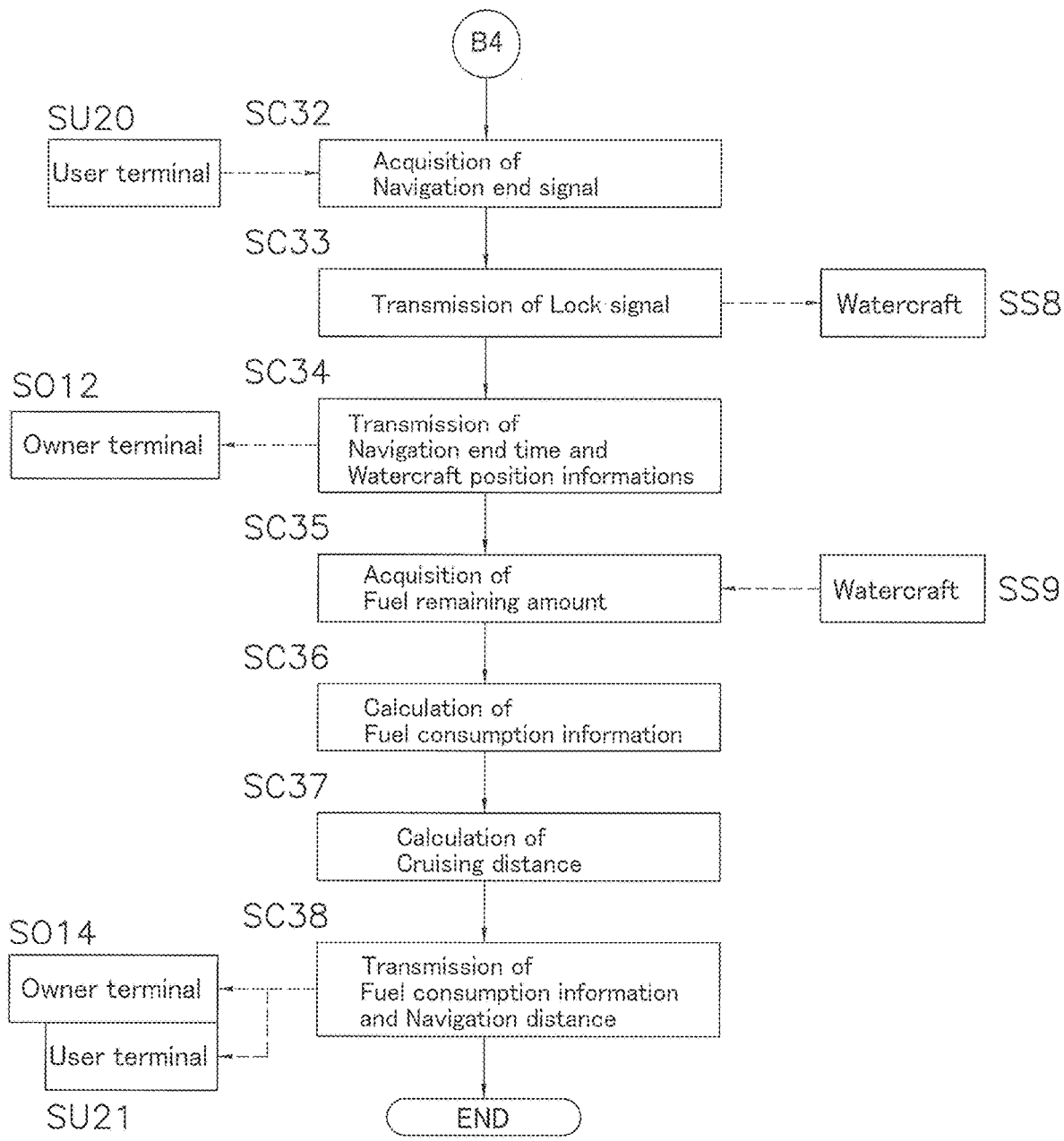
FIG. 6E is an additional flowchart which shows the process performed on the cloud server.

FIGS. 3A and 3B show processing modes of the owner terminal 5 (5a, 5b, 5c). FIGS. 4A to 4D show processing modes of the user terminal 7 (7a, 7b, 7c). FIG. 5 shows a processing mode of the watercraft 9 (9a, 9b, 9c). FIGS. 6A to 6E show processing modes of the cloud server 3.

The rental condition information is input to each of the plurality of owner terminals 5. Thus, each of the plurality of owner terminals 5 recognizes the rental condition information (SO1). Each owner terminal 5 transmits each rental condition information to the cloud server 3 (SO2). The cloud server 3 respectively acquires the plurality of rental condition information from the plurality of owner terminals 5 (SC1).

Each owner terminal 5 transmits the maintenance information to the cloud server 3 (SO3). The cloud server 3 respectively acquires the plurality of maintenance information from the owner terminal 5 (SC2). The cloud server 3 recognizes the owner terminal 5 from which the cloud server 3 acquires the maintenance information (SC3). Thus, the cloud server 3 recognizes the owner terminal 5 which rents the watercraft 9.

The cloud server 3 generates the borrowing input list based on the rental condition information of the owner terminal 5 from which the cloud server 3 acquires the maintenance information (SC4). The cloud server 3 transmits the plurality of rental condition information and the borrowing input list to the user terminal 7 (SC5).

The user terminal 7 acquires the plurality of rental condition information and the borrowing input list from the cloud server 3 (SU1). The user terminal 7 displays the plurality of rental condition information and the borrowing input list on the display 72 of the user terminal 7 (SU2). The user terminal 7 generates the borrowing request information of the user (SU3). The user terminal 7 displays the borrowing request information (SU4). The user terminal 7 transmits the borrowing request information to the cloud server 3 (SU5).

The cloud server 3 acquires the borrowing request information from the user terminal 7 (SC6). The cloud server 3 recognizes the borrowing target owner terminal 5 for which the user applies for borrowing (SC7). The cloud server 3 transmits the answer input information, which is used to cause the owner to input the answer to the borrowing request information, to the owner terminal 5 (SC8).

The owner terminal 5 acquires the answer input information from the cloud server 3 (SO4). The answer information for the answer input information is input to the owner terminal 5. Thus, the owner terminal 5 recognizes the answer information (SO5). The owner terminal 5 displays the answer information (SO6). The owner terminal 5 transmits the answer information to the cloud server 3 (SO7).

The cloud server 3 acquires the answer information from the owner terminal 5 (SC9). The cloud server 3 transmits the answer information to the user terminal 7 (SC10). The user terminal 7 acquires the answer information from the cloud server 3 (SU6). The user terminal 7 displays the answer information (SU7).

The confirmation information for the answer information is input to the user terminal 7. Thus, the user terminal 7 recognizes the confirmation information (SU8). The user terminal 7 transmits the confirmation information to the cloud server 3 (SU9). The cloud server 3 acquires confirmation information from the user terminal 7 (SC11). The cloud server 3 generates the contract information (SC12). The cloud server 3 transmits the contract information to the owner terminal 5 and the user terminal 7 (SC13).

The owner terminal 5 acquires the contract information from the cloud server 3 (SO8). The owner terminal 5 displays the contract information (SO9). The user terminal 7 acquires the contract information from the cloud server 3 (SU10). The user terminal 7 displays the contract information (SU11). Thus, the owner and the user are able to easily understand that the contract has been established or not established.

The user terminal 7 recognizes the terminal position information (SU12). The user terminal 7 transmits the information request signal which is used to request the watercraft position information to the cloud server 3 and the terminal position information, to the cloud server 3 (SU13).

The cloud server 3 acquires the terminal position information from the user terminal 7 (SC14). The cloud server 3 acquires the information request signal from the user terminal 7 (SC15). The cloud server 3 transmits the information request signal to the watercraft 9 (SC16). The watercraft 9 acquires the information request signal from the cloud server 3 (SS1). The watercraft 9 transmits the watercraft position information to the cloud server 3 (SS2).

The cloud server 3 acquires the watercraft position information from the watercraft 9 (SC17). The cloud server 3 transmits the watercraft position information to the user terminal 7 (SC18). The user terminal 7 acquires the watercraft position information from the user terminal 7 (SU14). The user terminal 7 displays the terminal position information and the watercraft position information (SU15). For example, the user terminal 7 displays the terminal position information and the watercraft position information on a map. Thus, the user is able to easily understand the position of the watercraft 9.

The cloud server 3 transmits the unlock signal to the watercraft 9 based on the terminal position information and the watercraft position information (SC19). The cloud server 3 determines whether or not the user terminal 7 has approached the watercraft 9 based on the terminal position information and the watercraft position information. For example, when the distance between the user terminal 7 and the watercraft 9 is larger than a predetermined distance, the cloud server 3 waits for the transmission of the unlock signal to the watercraft 9.

On the other hand, when the distance between the user terminal 7 and the watercraft 9 is less than or equal to the predetermined distance, the cloud server 3 transmits an unlock signal to the watercraft 9. In this case, the watercraft 9 acquires the unlock signal (SS3). Thus, the key lock of the watercraft 9 is automatically released by the cloud server 3.

In a state where the key lock of the watercraft 9 is released, the user terminal 7 transmits the lock request signal, which is used to request the key lock of the watercraft 9, to the cloud server 3 (SU16). For example, when the input for requesting the key lock of the watercraft 9 is executed by the user terminal 7, the user terminal 7 transmits the lock request signal to the cloud server 3.

The cloud server 3 acquires the lock request signal from the user terminal 7 (SC20). The cloud server 3 determines whether or not the lock request signal has been acquired from the user terminal 7. When the cloud server 3 has not acquired the lock request signal from the user terminal 7, the process of step 24 (SC24) is executed.

When the cloud server 3 acquires the lock request signal from the user terminal 7, the cloud server 3 transmits the lock signal to the watercraft 9 (SC21). In this case, the watercraft 9 acquires the lock signal from the cloud server 3 (SS4).

Thus, the key lock of the watercraft 9 is executed by the user terminal 7 via the cloud server 3. For example, even if the key lock of the watercraft 9 is released by the cloud server 3 when the user terminal 7 is separated from the watercraft 9, the user is able to execute the key lock on the watercraft 9.

The user terminal 7 transmits the unlock request signal, which is used to request the release of the key lock of the watercraft 9, to the cloud server 3 (SU17). For example, when the input for releasing the key lock of the watercraft 9 is executed by the user terminal 7, the user terminal 7 transmits the unlock request signal to the cloud server 3.

The cloud server 3 acquires the unlock request signal from the user terminal 7 (SC22). This process is executed when the cloud server 3 acquires the lock request signal from the user terminal 7. In this case, the cloud server 3 transmits the unlock signal to the watercraft 9 (SC23). The watercraft 9 acquires the unlock signal from the cloud server 3 (SS5). Thus, the user is able to release the key lock of the watercraft 9.

The user terminal 7 transmits the navigation start signal, which is used to notify the owner of the start of navigation, to the cloud server 3 (SU18). The cloud server 3 acquires the navigation start signal from the user terminal 7 (SC24). Thus, the cloud server 3 recognizes that the watercraft 9 has started navigating.

The cloud server 3 requests the watercraft 9 for the watercraft 9 position information at the time of acquiring the navigation start signal (SC25). The watercraft 9 transmits the watercraft position information at the time of acquiring the navigation start signal to the cloud server 3. Also, the watercraft 9 transmits the watercraft position information after the start of navigation to the cloud server 3 (SS6). For example, the watercraft 9 transmits the watercraft position information to the cloud server 3 at predetermined time intervals.

The cloud server 3 acquires the watercraft position information at the time of acquiring the navigation start signal from the watercraft 9 (SC26). The cloud server 3 transmits the navigation start time information and the watercraft position information at the time of acquiring the navigation start signal to the owner terminal 5 (SC27).

The owner terminal 5 acquires the navigation start time information and the watercraft position information from the cloud server 3 (SO10). The owner terminal 5 displays the navigation start time information and the watercraft position information (SO11). Thus, the owner is able to easily understand the time at the start of navigation and the position of the watercraft 9 at the start of navigation.

The user terminal 7 transmits the lock request signal to the cloud server 3 (SU19). For example, when the input for requesting the key lock of the watercraft 9 is executed by the user terminal 7, the user terminal 7 transmits the lock request signal to the cloud server 3.

The cloud server 3 acquires the lock request signal from the user terminal 7 (SC28). In this case, since the watercraft 9 has started navigating, the cloud server 3 regulates the transmission of the lock signal to the watercraft 9 (SC29). In this way, the key lock of the watercraft 9 is restricted while the watercraft 9 is navigating.

The watercraft 9 transmits the engine operation stop signal to the cloud server 3 (SS7). The cloud server 3 acquires the engine operation stop signal from the watercraft 9 (SC30). Also in this case, the cloud server 3 regulates the transmission of the lock signal to the watercraft 9 (SC31). In this way, the key lock of the watercraft 9 is restricted when the engine is stopped during the navigation of the watercraft 9.

The user terminal 7 transmits the navigation end signal which is used to notify the owner of the end of navigation to the cloud server 3 (SU20). The cloud server 3 acquires the navigation end signal from the user terminal 7 (SC32).

The cloud server 3 transmits the lock signal to the watercraft 9 (SC33). The watercraft 9 acquires the lock signal from the cloud server 3 (SS8). Thus, the key lock of the watercraft 9 is automatically executed by the cloud server 3 at the end of navigation.

The cloud server 3 transmits the navigation end time information and the watercraft position information to the owner terminal 5 (SC34). The owner terminal 5 acquires the navigation end time information and the watercraft position information from the cloud server 3 (SO12). The owner terminal 5 displays the navigation end time information and the watercraft position information (SO13). Thus, the owner is able to easily understand the rental end time and the watercraft position of the rental end time.

The watercraft 9 transmits the fuel remaining amount information to the cloud server 3 (SS9). The cloud server 3 acquires the fuel remaining amount information from the watercraft 9 (SC35). The cloud server 3 calculates the fuel consumption information based on the fuel remaining amount information (SC36). The cloud server 3 calculates the navigation distance information of the watercraft 9 based on the watercraft position information (SC37).

The cloud server 3 transmits the fuel consumption information and the navigation distance information to the user terminal 7 and the owner terminal 5 (SC38). The user terminal 7 acquires the fuel consumption information and the navigation distance information from the cloud server 3 (SU21). The user terminal 7 displays the fuel consumption information and the navigation distance information (SU22). Thus, the user is able to easily understand the fuel consumption information and the navigation distance information.

The owner terminal 5 acquires the fuel consumption information and the navigation distance information from the cloud server 3 (SO14). The owner terminal 5 displays the fuel consumption information and the navigation distance information (SO15). Thus, the owner is able to easily understand the fuel consumption information and the navigation distance information.

In the watercraft rental system 1 described above, one of the plurality of watercrafts 9 (9a, 9b, 9c), which is respectively managed by the plurality of owners, is rented from the owner to the user via the cloud server 3. Thus, the owner is able to directly contract with the user via the cloud server 3. In other words, the owner is able to directly rent the watercraft 9 to the user via the cloud server 3.

Also, the rented watercraft 9 is managed by the cloud server 3 according to the navigation state from the start of navigation to the end of navigation. Thus, the owner is able to rent the watercraft 9 to the user in a state where the watercraft 9 is managed by the cloud server 3.

Further, the usage status of the rented watercraft 9 (the information such as the start of navigation and the end of navigation, and the information after the end of navigation) is provided to the owner via the cloud server 3. Thus, the owner is able to easily understand the usage status of the watercraft 9.

In the above-described preferred embodiments, when a refueling work for the watercraft 9 is executed, the cloud server 3, the owner terminal 5, and the user terminal 7 preferably execute the following processes. These processes are executed before navigation of the watercraft 9 (for example, the step SC12 of the cloud server 3) and/or after return of the watercraft 9 (for example, between the steps SC32 and SC38 of the cloud server 3).

In this case, the watercraft rental system 1 described above may further include a refueling settlement terminal. The refueling settlement terminal is provided, for example, at a refueling station.

The refueling settlement terminal identifies identification information of the user terminal 7 when the user refuels the watercraft 9. The refueling settlement terminal provides the cloud server 3 with the identification information and refueling settlement information corresponding to a refueling settlement. For example, the refueling settlement terminal transmits the identification information of the user terminal 7 and the refueling settlement information.

The cloud server 3 identifies the user terminal 7 based on the identification information, and provides the refueling settlement information to the owner terminal 5 which has a contractual relationship with the user terminal 7.

Specifically, the refueling settlement terminal transmits the identification information and the refueling settlement information acquired from the refueling settlement terminal to the information receiver 33 of the cloud server 3. The processor 31a of the cloud server 3 recognizes the identification information and the refueling settlement information, and records the identification information and the refueling settlement information in the memory 31b of the cloud server 3.

The processor 31a of the cloud server 3 searches for the user terminal 7 based on the identification information acquired from the refueling settlement terminal. The processor 31a of the cloud server 3 searches for the owner terminal 5 that has the contractual relationship with the user terminal 7.

For example, the processor 31a of the cloud server 3 searches for the identification information of the owner terminal 5 corresponding to the identification information of the user terminal 7. Thus, the processor 31a of the cloud server 3 recognizes the user terminal 7 and the owner terminal 5 which have the contractual relationship with each other.

When the user terminal 7 performs a first connection to the cloud server 3, the identification information of the user terminal 7 is provided from the user terminal 7 to the cloud server 3. When the owner terminal 5 performs a first connection to the cloud server 3, the identification information of the owner terminal 5 is provided from the owner terminal 5 to the cloud server 3.

The identification information of each user terminal 7 and the identification information of each owner terminal 5 are recorded in the memory 31b of the cloud server 3. The identification information of the user terminal 7 and the identification information of the owner terminal 5, which have the contractual relationship with each other, are recorded in the memory 31b of the cloud server 3, for example, as table data.

The processor 31a of the cloud server 3 modifies the contract information so that consideration of the refueling work of the user is reflected. For example, when the user refuels, the processor 31a of the cloud server 3 executes the process to modify the conditions such as reduction of usage fee and extension of usage time which is included in the contract information. The modified contract information is recorded in the memory 31b of the cloud server 3.

The processor 31a of the cloud server 3 issues a command, which is used to transmit the refueling settlement information to the information receiver 53 of the owner terminal 5, to the information provider 34 of the cloud server 3.

Also, the processor 31a of the cloud server 3 issues a command, which is used to transmit the modified contract information to the information receiver 53 of the owner terminal 5, to the information provider 34 of the cloud server 3. Further, the processor 31a of the cloud server 3 issues a command, which is used to transmit the modified contract information to the information receiver 73 of the user terminal 7, to the information provider 34 of the cloud server 3.

The processor 51a of the owner terminal and the processor 71a of the user terminal 7 recognize the refueling settlement information and the modified contract information, respectively.

The processor 51a of the owner terminal and the processor 71a of the user terminal 7 record the refueling settlement information and the modified contract information in the memory 51b of the owner terminal and the memory 71b of the user terminal 7 respectively.

The processor 51a of the owner terminal and the processor 71a of the user terminal 7 display the refueling settlement information and the modified contract information on the displays 52 and 72, respectively.

Thus, the owner and the user are able to visually recognize the matter that the conditions such as the reduction of the usage fee and the extension of the usage time have been changed by the refueling work of the user.

In the above-described preferred embodiments, when each owner rents the watercraft 9 to the user, each owner provides the renting condition information to the cloud server 3. The rental condition information may include information which is used when each of the plurality of owners selects the user. For example, the rental condition information may include user selection condition information. This process is executed, for example, in step SO1 of the owner terminal 5.

In this case, the user selection condition information includes a threshold value corresponding to an average evaluation of the user, the number of borrowings of the user, the borrowing time of the user, the number of the open sea experiences of the user, the navigation time of the user in the open sea, and the like.

When the user selection condition information (the threshold value) is input to the rental condition input information (the item information) via the input 55 of the owner terminal 5 of each owner, the user selection condition information (the threshold value) is recognized by the processor 51a of the owner terminal.

In this way, the rental condition information including the user selection condition information (the threshold value) is generated. The rental condition information including the user selection condition information (the threshold value) is provided from the owner terminal 5 to the processor 31a of the cloud server 3 and is recorded in the memory 31b of the cloud server 3.

The average evaluation information corresponding to the average evaluation of the user is set as follows. Each owner evaluates each user after the rental of the watercraft 9 is completed (for example, after the step 15 of the owner terminal 5).

For example, the evaluation information of each user is recognized by the processor 51a of the owner terminal by inputting the evaluation information of each user in the input 55 of each owner terminal 5. The evaluation information of each user is provided to the processor 31a of the cloud server 3 and is recorded in the memory 31b of the cloud server 3. The processor 31a of the cloud server 3 calculates the average evaluation information of each user by averaging the evaluation information of each user.

The processor 31a of the cloud server 3 recognizes the user terminal 7 that satisfies the user selection condition information (the threshold value). This process is executed between the steps SC4 and SC5 of the cloud server 3.

After that, in step SC5 of the cloud server 3, the processor 31a of the cloud server 3 transmits the borrowing input list to the user terminal 7. On the other hand, the processor 31a of the cloud server 3 does not transmit the borrowing input list in the step SC5 (SC5) to the user terminal 7 that does not satisfy the above conditions. By processing in this way, the owner is able to exclude users with a bad evaluation from the rental target.

In the above-described preferred embodiments, the watercraft 9 is rented to the user in case that the user terminal 7 transmits the borrowing request information to the cloud server 3 and the owner terminal 5 transmits the answer information to the cloud server 3.

Instead of this, the cloud server 3 may rent the watercraft 9 to the user when the user terminal 7 satisfies the user selection condition information in the above and the user terminal 7 transmits the borrowing request information to the cloud server 3.

In this case, since the user terminal 7 satisfies the user selection condition information, the cloud server 3 rents the watercraft 9 to the user without waiting for the answer information of the owner terminal 5. Thus, the watercraft 9 is able to be easily rented to the user.

In the above-described preferred embodiments, the owner terminal 5, the user terminal 7, and the watercraft 9 respectively receive the information from the cloud server 3, and the processor circuitries 51, 71, and 91 respectively perform the processing of the information in the owner terminal 5, the user terminal 7, and the watercraft 9.

Instead of this, the owner terminal 5, the user terminal 7, and the watercraft 9 may directly access the information on the cloud server 3, and the processor circuitries 51, 71, and 91 may perform the processing of the above-described preferred embodiments on the cloud server 3. In this case, for example, the cloud server 3 is used as a data server.

Also, the owner terminal 5, the user terminal 7, and the watercraft 9 may directly access the information on the cloud server 3 and directly input the information on the cloud server 3. In this case, the processor circuitry 31 of the cloud server 3 executes the processes of the above-described preferred embodiments.

In the above-described preferred embodiments, the cloud server 3 determines the approach of the user terminal 7 to the watercraft 9 based on the terminal position information and the watercraft position information.

Instead of this, the user terminal 7 may communicate directly with the watercraft 9 (the communicator 92) without communicating via the cloud server 3, so that the user terminal 7 determines the approach of the user terminal 7 to the watercraft 9 based on the terminal position information and the watercraft position information.

In the above-described preferred embodiments, the user terminal 7 executes the key lock and the key unlock of the watercraft 9 via the cloud server 3. Instead of this, the user terminal 7 may directly communicate with the watercraft 9 (the communicator 92) without communicating via the cloud server 3 to lock the key of the watercraft 9 and release the key of the watercraft 9.

In this case, the processor circuitry 91 (the processor 91a) for the watercraft 9 confirms with the cloud server 3 whether or not the user terminal 7 has made a borrowing contract for the watercraft 9. Then, the key lock and the key unlock of the watercraft 9 is preferably performed. The confirmation, as to whether or not the user terminal 7 has made the borrowing contract for the watercraft 9, is performed with the identification information of the user terminal 7 illustrated in the variation (A1).

In the above-described preferred embodiments, the key lock of the watercraft 9 is released when the user terminal 7 is determined to approach the watercraft 9. When it is determined that the user terminal 7 approaches the watercraft 9, at least one of the cloud servers 3 and the user terminal 7 may transmit a signal, which is used to request the watercraft 9 to sound the horn, to the communicator 92. Thus, when the user terminal 7 approaches the watercraft 9, the horn of the watercraft 9 sounds and the user is able to easily understand the position of the watercraft 9.

In the above-described preferred embodiments, the cloud server 3 regulates the execution of the key lock of the watercraft 9. Instead of this, the processor circuitry 91 of the watercraft 9, for example, the processor 91a of the watercraft 9 may directly regulate the execution of the key lock of the watercraft 9. In this case, if it is determined that the watercraft 9 is navigating based on the watercraft position information and/or the engine operation information when the watercraft 9 recognizes the input of the key lock, the processor 91a of the watercraft 9 regulates the execution of the key lock process.

Figure 7:
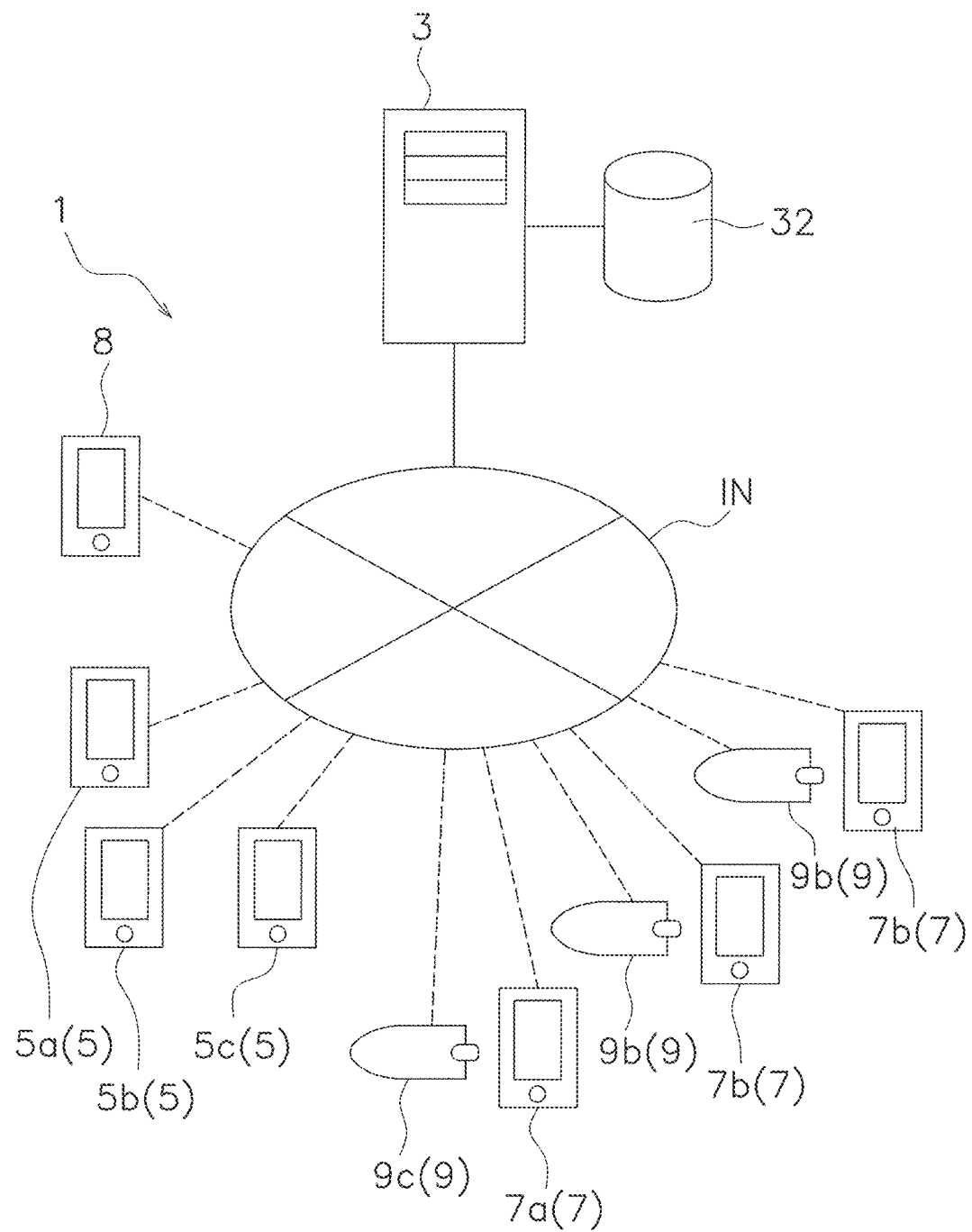
FIG. 7 is a schematic diagram which shows the watercraft rental system according to another preferred embodiment of the present invention.

The maintenance information may include authorizing information which is provided by a dealer. For example, as shown in FIG. 7, the watercraft rental system 1 may include at least one dealer terminal 8. The dealer terminal 8 transmits the authorizing information to the cloud server 3 when the maintenance is completed. For example, the authorizing information includes a serial number of the engine of the watercraft 9 and content of the maintenance.

The cloud server 3 recognizes the watercraft 9, of which the dealer completes the maintenance, based on the authorizing information. The cloud server 3 recognizes the watercraft 9, which is identified based on the authorizing information, as a rentable watercraft. Thus, it is possible to rent the watercraft 9, of which the dealer completes the maintenance, to the user. The authorizing information may include identification information of a specific dealer. The cloud server 3 recognizes the watercraft 9, which the specific dealer completes the maintenance, as a rentable watercraft base on the identification information.

In the above-described preferred embodiments, the usage fee corresponding to a usage status of the engine is displayed on the user terminal 7 and the owner terminal 5. The cloud server 3 may estimate a maintenance fee by considering time-related deterioration of the watercraft 9 and/or the engine. For example, the time-related deterioration of the watercraft 9 may be determined based on usage days of the watercraft 9. The time-related deterioration of the watercraft 9 of the engine may be determined based on days elapsed from usage starting date of the engine.

The cloud server 3 may estimate the maintenance fee by considering the load such as the engine rotation speed. The cloud server 3 may calculate a minimum fee, which is recommended for the owner, based on the usage status of the engine and the estimated maintenance fee. The cloud server 3 may cause the owner terminal 5 to display the minimum fee. Thus, the owner is able to determine the rental fee by considering maintenance cost required for the maintenance.

When the fuel consumption amount of the watercraft 9 is equal to or is smaller than a predetermined rate of a fuel remaining amount of a navigation start, the cloud server 3 causes the user terminal 5 to display warning information. Thus, the user is able to easily understand a consumption rate of the fuel even if the watercraft 9 is used for the first time. For example, the predetermined rate is one third of the fuel remaining amount. The value of the predetermined rate may be smaller than one third or may be greater than one third.

In the above-described preferred embodiments, the user terminal 7 is configured or programmed to communicate with the watercraft 9 via the internet IN, for example. The user terminal 7 may be configured or programmed to communicate directly to the watercraft 9. For example, the user terminal 7 may be configured or programmed to communicate directly to the watercraft 9 with a near field communication such as a wireless local area network and Bluetooth (a registered trademark).

In this case, the cloud server 3 may be configured or programmed to provide the user terminal 7 with the authority to unlock the watercraft 9. For example, the cloud server 3 may transmit key information to unlock the watercraft 9 to the user terminal 7. For example, the key information may include a target watercraft for unlocking, target time, and a key for unlocking. The watercraft 9 may be unlocked by causing the user terminal 7 to transmit the key information to the watercraft 9. The user terminal 7 may display the key information. The watercraft 9 may be unlocked by causing the user to manually input the key information on an input of the watercraft 9.

According to preferred embodiments of the present invention, it is possible to directly rent an owner's watercraft to a user by using the watercraft rental system, the computer for the watercraft 9, and the watercraft rental method.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A watercraft rental system for renting an owner's watercraft to a user, the watercraft rental system comprising:
   a computer configured or programmed to communicate with the watercraft and record rental condition information of the watercraft;
   a user terminal to provide borrowing request information to the computer, the borrowing request information corresponding to a response to the rental condition information;
   a communicator provided on the watercraft; and
   a watercraft position detector provided on the watercraft to detect watercraft position information of the watercraft; wherein
   the computer is configured or programmed to execute a rental process of the watercraft based on the borrowing request information;
   the computer is configured or programmed to receive the watercraft position information from the communicator;
   the computer is configured or programmed to transmit an unlock signal to unlock a key lock of the watercraft to the communicator when the computer determines that the user terminal has approached the watercraft based on terminal position information indicating a position of the user terminal and the watercraft position information; and
   the computer is configured or programmed to not operate an engine of the watercraft in a key lock state in which the key lock is locked when the user terminal has separated from the watercraft, and to operate the engine in a key unlock state in which the key lock is unlocked when the user terminal has approached the watercraft.

2. The watercraft rental system according to claim 1, wherein
   the at least one of the computer and the user terminal is configured or programmed to transmit a signal to request a horn sound from the watercraft to the communicator in a state where the computer determines that the user terminal has approached the watercraft.

3. The watercraft rental system according to claim 1, wherein
   the user terminal is configured or programmed to transmit a lock request signal to request the key lock of the watercraft to the computer; and
   the computer is configured or programmed to execute the key lock with respect to the watercraft based on the lock request signal.

4. The watercraft rental system according to claim 1, wherein
   the communicator provides fuel remaining amount information to the computer; and
   the computer is configured or programmed to calculate navigation distance information of the watercraft based on the fuel remaining amount information and provide the navigation distance information to the user terminal.

5. The watercraft rental system according to claim 1, further comprising:
   a maintenance information providing terminal to provide maintenance information indicating an end of maintenance of the watercraft to the computer; wherein
   the computer is configured or programmed to provide the rental condition information to the user terminal when the maintenance information is provided from the maintenance information providing terminal.

6. The watercraft rental system according to claim 1, wherein
the computer is configured or programmed to provide the rental condition information including driver addition information indicating whether or not to add a driver of the watercraft to the user terminal.

7. The watercraft rental system according to claim 1, further comprising:
an owner terminal to communicate with the computer and provide the rental condition information to the computer.

8. The watercraft rental system according to claim 7, wherein
the computer is configured or programmed to provide answer input information to the owner terminal and to provide answer information to the user terminal;
the answer input information corresponds to the borrowing request information; and
the answer information is provided from the owner terminal and corresponds to a response to the answer input information.

9. The watercraft rental system according to claim 7, further comprising:
a refueling settlement terminal to identify identification information of the user terminal when the user refuels the watercraft; wherein
the refueling settlement terminal is configured or programmed to provide refueling settlement information corresponding to a refueling settlement and the identification information to the computer; and
the computer is configured or programmed to identify the user terminal based on the identification information and provide the refueling settlement information to the owner terminal which has a contractual relationship with the user terminal.

10. The watercraft rental system according to claim 9, wherein
the computer is configured or programmed to modify contract information so as to include consideration of refueling work of the user and provide the modified contract information to the user terminal and the owner terminal.

11. The watercraft rental system according to claim 7, wherein
the computer is configured or programmed to provide fuel consumption information indicating a fuel consumption amount of the watercraft to the user terminal or the owner terminal; and
the user terminal or the owner terminal, to which the fuel consumption information is provided, is configured or programmed to display the fuel consumption amount.

12. The watercraft rental system according to claim 11, wherein the user terminal or the owner terminal displays a fuel fee corresponding to the fuel consumption amount.

13. The watercraft rental system according to claim 12, wherein the computer is configured or programmed to acquire fuel rate information and calculate the fuel fee based on the fuel consumption amount and the fuel rate information.

14. The watercraft rental system according to claim 13, wherein the computer is configured or programmed to acquire the fuel rate information by an administrator input to the computer or from another computer.

15. A watercraft rental system for renting an owner's watercraft to a user, the watercraft rental system comprising:
a computer configured or programmed to communicate with the watercraft and record rental condition information of the watercraft;
a user terminal to provide borrowing request information to the computer, the borrowing request information corresponding to a response to the rental condition information;
a communicator provided on the watercraft; and
an engine operation detector provided on the watercraft to detect an operating state of an engine; wherein
the computer is configured or programmed to execute a rental process of the watercraft based on the borrowing request information;
the computer is configured or programmed to receive engine operation information indicating the operating state of the engine from the communicator of the watercraft, and to determine whether the watercraft is navigating based on the engine operation information; and
the computer is configured or programmed to regulate execution of a key lock of the watercraft by regulating transmission of a lock signal to execute the key lock of the watercraft to the communicator when the computer determines that the watercraft is navigating.

16. A watercraft rental system for renting an owner's watercraft to a user, the watercraft rental system comprising:
a computer configured or programmed to communicate with the watercraft and record rental condition information of the watercraft;
a user terminal to provide borrowing request information to the computer, the borrowing request information corresponding to a response to the rental condition information; and
a communicator provided on the watercraft; wherein the computer is configured or programmed to execute a rental process of the watercraft based on the borrowing request information;
the computer is configured or programmed to determine whether the watercraft separates from a shore at a predetermined distance or more; and
the computer is configured or programmed to regulate execution of a key lock of the watercraft by regulating transmission of a lock signal to execute the key lock of the watercraft to the communicator or the watercraft is configured or programmed to regulate the execution of the key lock, when the computer determines that the watercraft separates from the shore at the predetermined distance or more.

* * * * *